(12) United States Patent
Jin

(10) Patent No.: US 10,813,377 B2
(45) Date of Patent: Oct. 27, 2020

(54) PREPARATION OF MODIFIED CELLULOSE AND ITS DERIVATIVES

(71) Applicant: Innotech Materials, LLC, Wawatosa, WI (US)

(72) Inventor: Wiechang Jin, Wauwatosa, WI (US)

(73) Assignee: Innotech Materials, LLC, Wauwatosa, WI (US)

( * ) Notice: Subject to any disclaimer, the term of this patent is extended or adjusted under 35 U.S.C. 154(b) by 214 days.

(21) Appl. No.: 15/771,829

(22) PCT Filed: Oct. 28, 2016

(86) PCT No.: PCT/US2016/059413
§ 371 (c)(1),
(2) Date: Apr. 27, 2018

(87) PCT Pub. No.: WO2017/075417
PCT Pub. Date: May 4, 2017

(65) Prior Publication Data
US 2018/0319957 A1   Nov. 8, 2018

Related U.S. Application Data

(60) Provisional application No. 62/247,292, filed on Oct. 28, 2015.

(51) Int. Cl.
| | | |
|---|---|---|
| C08B 15/02 | (2006.01) | |
| C08B 15/05 | (2006.01) | |
| C08B 3/06 | (2006.01) | |
| C08B 15/04 | (2006.01) | |
| A23L 29/262 | (2016.01) | |
| A23D 9/007 | (2006.01) | |

(52) U.S. Cl.
CPC .............. *A23L 29/262* (2016.08); *C08B 3/06* (2013.01); *C08B 15/02* (2013.01); *C08B 15/04* (2013.01); *C08B 15/05* (2013.01); *A23D 9/007* (2013.01)

(58) Field of Classification Search
None
See application file for complete search history.

(56) References Cited

U.S. PATENT DOCUMENTS 7,005,514 B2   2/2006  Nguyen
2013/0052704 A1  2/2013  Medoff et al.

FOREIGN PATENT DOCUMENTS

| RU | 2549968 C2 | 5/2015 |
| WO | 9940120 A1 | 8/1999 |
| WO | 2010138941 A2 | 12/2010 |
| WO | 2013000074 A1 | 1/2013 |
| WO | 2014009517 A1 | 1/2014 |

OTHER PUBLICATIONS

U.S. Patent Office, "Notification of Transmittal of the International Search Report and the Written Opinoin of the International Searching Authority, or the Declaration," in connection to PCT/US2016/59413, filed Oct. 28, 2016, 9 pages, dated Jan. 5, 2017.
Collinson, S.R., et al., "The Catalytic Oxidation of Biomass to New Materials Focusing on Startch, Cellulose and Lignin," Coordination Chemistry Reviews 254, pp. 1854-1870 Apr. 24, 2010.
European Patent Office, Extended European Search Report in connection with PCT/US2016/059413 filed Oct. 28, 2016, 8 pages, dated Jun. 11, 2019.

*Primary Examiner* — Layla D Berry
(74) *Attorney, Agent, or Firm* — McKee, Voorhees & Sease, PLC

(57) ABSTRACT

This invention discloses methods for producing modified cellulose, modified nanocellulose, modified nanocellulose functionalized with other functional species, and derivatives thereof. The present invention also provides cellulose, nanocellulose, and their derivatives that are safe to use inside an animal or human body and are biocompatible without costly purification. These cellulose or nanocellulose materials can be used in many different applications, including carrier for pharmaceutical active agents and other medical devices.

17 Claims, 25 Drawing Sheets

PREPARATION OF MODIFIED CELLULOSE AND ITS DERIVATIVES

FIELD OF THE INVENTION

The present invention relates to the methods for preparing modified cellulose, modified nanocellulose, and their derivatives that can be used in biological applications and the modified cellulose, modified nanocelluloses, and their derivatives produced from these methods. It also relates to the methods for preparing modified celluloses from biomass materials and for reducing cellulose particle size. More particularly, it relates to the incorporation of biologically important groups such as amino acids onto the nanocellulose for biomedical applications.

BACKGROUND OF THE INVENTION

Nanocellulose is a safe, non-toxic, and biodegradable biomaterial, and it is abundant, inexpensive, and environmentally sustainable. As a highly crystalline material, nanocellulose has exceptional mechanical strength so it is useful as reinforcing agents in bio-composites and has many potential applications in military use for lightweight armor and ballistic glass as well as in automotive, aerospace, electronics, consumer products and medical industries. As a glucose-based polymer, it is biocompatible and has been explored for use in tissue engineering and drug delivery. Furthermore, due to the presence of the glucose unit, nanocellulose is amenable to chemical modifications in functionalization and bioconjugation for use of diagnostics and treatment of various diseases.

With its outstanding properties, such as significantly increased surface area, biocompatibility, and biodegradability, nanocellulose has many potentials in biomedical applications including drug delivery, the diagnosis and treatment of various diseases, and purification of biomolecules such as DNA, RNA, and enzymes. For example, a pH sensitive cellulose nanocrystals (CNC)/alginate microsphere-based controlled release system and drug molecules-containing CNC have been developed for drug delivery. Chemically labeled nanocellulose with fluorescent isothiocyanate (FITC) fluorophore has been developed for fluorescence bioassays and bio-imaging applications. Nanocellulose functionalized with gold nanoparticles and super-paramagnetic iron oxides have been developed for the delivery of biomolecules, diagnostic and therapeutic purposes.

However, current technologies for the production of nanocellulose starting from renewable biomass, such as forest and agricultural residues, have several drawbacks including safety issues and manufacturing capability due to the use of high concentration of caustic strong acid or toxic bleach processes. To use these nanocelluloses in biological applications for humans or animals, costly purification or cleaning processes are often required. Furthermore, these processes produce lots of chemical waste after acid hydrolysis or toxic halogenated by-products. As a result, an environmentally sustainable and cost effective procedure to produce nanocellulose is still desirable, at least for the utilization of renewable biomass.

Using cellulose-containing renewable biomass such as forest residues (e.g. wood or agricultural residues (e.g. wheat, barley, and cotton), current technologies for production of nanocellulose utilize two different methods. The first method consists of acid hydrolysis of cellulose using concentrated strong acids such as 65% sulfuric acid. It yields cellulose nanocrystals (CNC) that are rod-like in shape and 50-500 nm long and 3-20 nm with. Because of the use of strong acid, this method requires subsequent neutralization, which is expensive and produces a large quantity of salts. Another method is a TEMPO/bleach/NaBr oxidation process followed by high pressure homogenization to mechanically break-down cellulose, where TEMPO is (2,2,6,6-Tetramethylpiperidin-1-yl)oxyl or (2,2,6,6-tetramethylpiperidin-1-yl)oxidanyl. It yields cellulose nanofibrils (CNF) that have whisker-type shapes a few micrometers in length and 30-50 nm in width. Since the hydroxylmethyl group in glucose is oxidized to carboxylic acid during the process, the produced nanocellulose is often called oxidized nanocellulose. However, due to the use of toxic bleach and halogenated compounds, the produced nanocellulose has restricted applications. Furthermore, because this method needs dilute conditions and a laborious separation procedure, it has a limited manufacturing capability. TEMPO ligand is also expensive and produces lots of toxic halogenated byproducts. Thus, it is desirable to develop an effective and environmentally sustainable process to produce nanocellulose.

Nanocellulose by itself is a safe and non-toxic biomaterial that provides enormous opportunities to revolutionize materials and chemical industries. However, the use of caustic or toxic processes in the production of nanocellulose has restricted its applications, especially in food and biomedical applications. Furthermore, the properties of nanocellulose need to be tuned for complete utilization.

This invention relates to a different process for the production of nanocellulose derivatives using non-toxic chemicals with minimum chemical wastes. The production of modified cellulose, modified nanocellulose, and their derivatives by this invention can start from bleached wood fiber or food or pharmaceutical grade microcrystalline cellulose (MCC). Furthermore, this invention demonstrates the synthesis of functionalized nanocellulose with nitrogen-containing compounds such as ammonia, ethylene diamine, glycine, lysine, and dopamine and their use in the preparation of nanocellulose derivatives, such as nanocellulose-based nanomagnets for diagnostics, DNA purification, and treatments of various diseases.

Other objects, advantages and features of the present invention will become apparent from the following specification taken in conjunction with the accompanying drawings.

SUMMARY OF THE INVENTION

The present invention provides a method of producing carboxylic acid-containing microcellulose or nanocellulose through a catalytic oxidation process and a method of converting microcellulose or nanocellulose into the corresponding nanocellulose or smaller nanocellulose through a catalytic cellulose cleavage process. The present invention also provides a method of producing nanocellulose with additional functional group(s), such as amine, amine derivatives, or an amino acid. The produced nanocellulose can then be combined with other compounds or agents to make nanocellulose complex or nanocellulose derivative. These nanocellulose and nanocellulose derivative have enhanced biomedical applications.

In one aspect, the present invention provides a method of producing an oxidized cellulose, the method comprising contacting an unmodified cellulose at a temperature with an oxidation composition for a period to produce an oxidized cellulose, wherein the oxidation composition comprises an iron-organic acid complex and hydrogen peroxide; and the iron-organic acid complex comprises an iron ion and at least one organic acid. As used herein, an unmodified cellulose is a polymer or material comprising a polymer that comprises a monomer represented by formula I shown here:

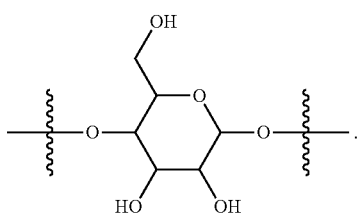

I

In another aspect, the present invention provides a method of producing an oxidized nanocellulose. The method comprises contacting an oxidized cellulose with a cleavage composition at a temperature for a period to form an oxidized nanocellulose, wherein the cleavage composition comprises an iron-organic complex and hydrogen peroxide; and the iron-organic acid complex comprises an iron ion and at least one organic acid. The method further comprises contacting the oxidized cellulose or the oxidized nanocellulose with a modification composition at a temperature to form a modified nanocellulose, wherein the modification composition comprises (a) a modification agent and (b) an acid, wherein the modification agent is an alcohol, amine, peptide, amino acid, carboxylic acid anhydride, or combination thereof. As used herein, an oxidized cellulose or oxidized nanocellulose is a polymer or a material comprising a polymer that comprises a monomer represented by formula II shown here:

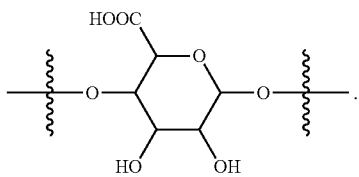

II

In another aspect, the present invention provides a cellulose composition produced by one of the methods disclosed herein. The cellulose composition can be microcellulose or nanocellulose composition produced by the disclosed oxidation process. Or the cellulose composition can be a nanocellulose composition produced by the disclosed cleavage process alone, the modification process following the cleavage process, cleavage process following the oxidation process, or a mixed process thereof.

In yet another aspect, the present invention provides a cellulose complex composition, the complex composition comprises a cellulose composition produced by one of the methods disclosed herein and an additional functional ingredient. The additional functional ingredient can be a metal oxide, oil, protein, a pharmaceutical active agent, a metal ion, a metal-ligand complex, an antibody, an enzyme, an antigen, or combination thereof. The present invention also provides a nanocellulose complex composition. The complex composition comprises a nanocellulose composition produced by one of the methods disclosed herein and an additional functional ingredient.

In one aspect, the present invention provides a method of reducing particle size of a cellulose composition. The method comprises applying one of the methods utilizing the disclosed cleavage process and/or modification process.

In yet another aspect, the present invention provides a method of producing cellulose composition from a biomass material. In some embodiments, the method comprises contacting a biomass material by an oxidation composition to produce an oxidized cellulose product. In some other embodiments, the method further comprises contacting the oxidized cellulose product with a cleavage composition and/or modification composition as in any of the disclosed methods utilizing such cleavage composition and/or modification composition.

While multiple embodiments are disclosed, still other embodiments of the present invention will become apparent to those skilled in the art from the following detailed description which shows and describes illustrative embodiments of the invention. Accordingly, the drawings and detailed description are to be regarded as illustrative in nature and not restrictive.

Figure 1A:
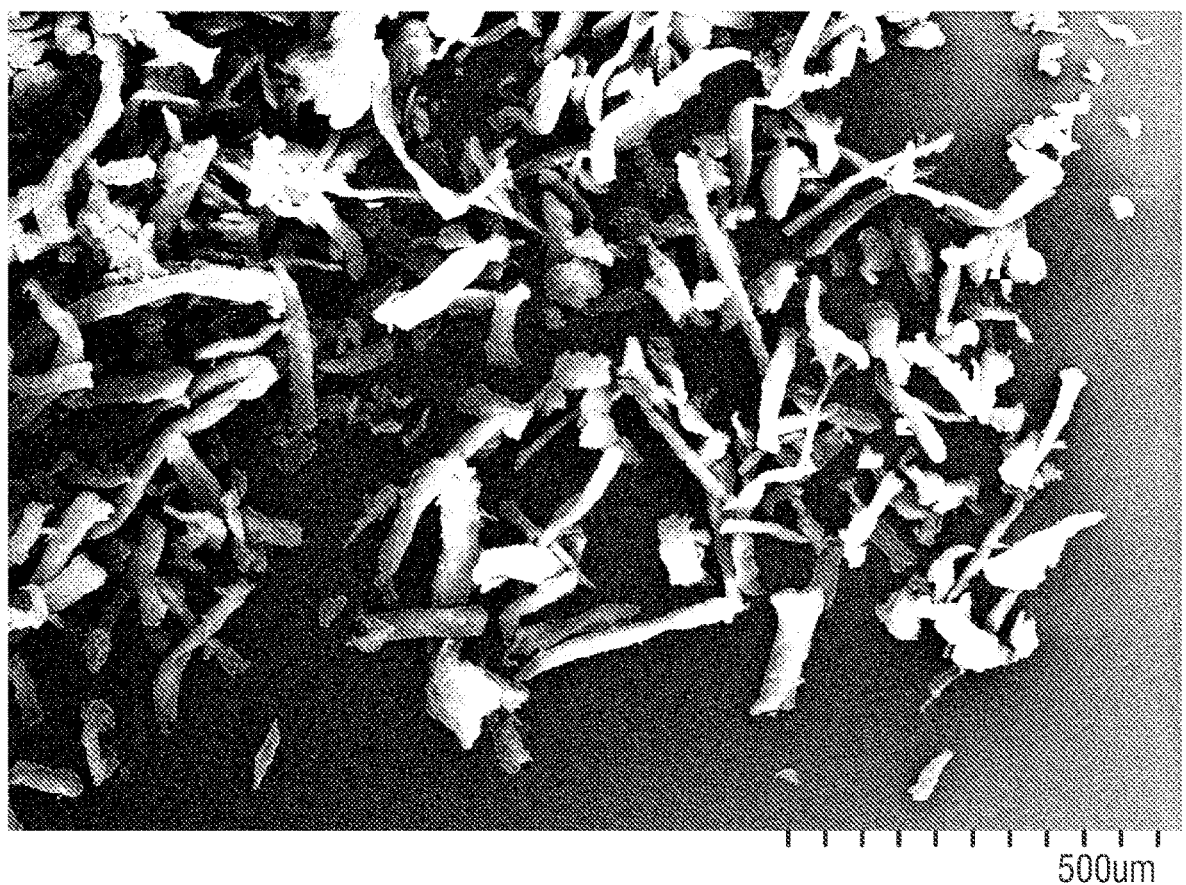
FIG. 1A shows an SEM image of carboxymethyl cellulose with the scale 500 μm.

Various embodiments of the present invention will be described in detail with reference to the drawings wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments of this invention are not limited to particular compounds or methods of preparation and/or treatment which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation. The preferred materials and methods are described herein. In describing and claiming the embodiments of the present invention, the following terminology will be used in accordance with the definitions set out below.

The term "about," as used herein, refers to variations in size, distance or any other types of measurements that can be resulted from inherent heterogeneous nature of the sample and imprecise nature of the measurements itself. The term "about" also encompasses variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "independently" means that where more than one substituent is selected from a number of possible substituents, those substituents may be the same or different.

As used herein, "substituted" refers to an organic group as defined below (i.e., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups as defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having 2 to about 30 carbon atoms, and further including at least one double bond. In some embodiments alkenyl groups have from 2 to about 20 carbon atoms, or typically, from 2 to 10 carbon atoms. Alkenyl groups may be substituted or unsubstituted. Alkenyl groups may be substituted similarly to alkyl groups.

As used herein, the terms "alkylene", "cycloalkylene", "alkynylene", and "alkenylene", alone or as part of another substituent, refer to a divalent radical derived from an alkyl, cycloalkyl, or alkenyl group, respectively, as exemplified by —CH2CH2CH2-. For alkylene, cycloalkylene, alkynylene, and alkenylene groups, no orientation of the linking group is implied.

As used herein, "aryl" or "aromatic" groups are cyclic aromatic hydrocarbons that do not contains heteroatoms. Aryl groups include monocyclic, bicyclic, and polyclyclic ring systems. Thus, aryl groups include, but are not limited to, phenyl, azulenyl, heptalenyl, biphenylenyl, indacenyl, florenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, in others from 6 to 12 or 6-10 carbon atoms in the ring portions of the groups. The phrase "aryl groups" includes groups containing fused rings, such as fused aromatic-aliphatic ring systems. Aryl groups may substituted or unsubstituted.

A heterocyclic group is a cyclic group having, as ring members, atoms of at least two different elements, which cyclic group may be saturated, partially unsaturated (non-aromatic) or fully unsaturated (aromatic). The terms "heterocyclic" or "heterocyclyl" include heterocycloalkyl and heteroaryl groups. It is to be understood that the terms heterocyclic, heterocyclyl, heteroaryl and heterocycloalkyl are intended to encompass stable groups where a ring nitrogen heteroatom is optionally oxidized (e.g., heteroaryl groups containing an N-oxide, such as oxo-pyridyl (pyridyl-N-oxide) and oxo-oxadiazolyl (oxo-4,5-dihydro-1,3,4-oxadiazolyl) or where a ring sulfur heteroatom is optionally oxidized (e.g., heterocycloalkyl groups containing sulfones or sulfoxide moieties, such as tetrahydrothienyl-1-oxide (tetrahydrothienyl sulfoxide, tetrahydrothiophenyl sulfoxide) and tetrahydrothienyl-1,1-dioxide (tetrahydrothienyl sulfone)).

"Heterocycloalkyl" refers to a non-aromatic, monocyclic or bicyclic group containing 3-10 ring atoms, being saturated or having one or more degrees of unsaturation and containing one or more (generally one or two) heteroatom substitutions independently selected from oxygen, sulfur, and nitrogen. Examples of "heterocycloalkyl" groups include, but are not limited to, aziridinyl, thiiranyl, oxiranyl, azetidinyl, oxetanyl, thietanyl, pyrrolidinyl, pyrrolinyl, pyrazolidinyl, pyrazolinyl, imidazolidinyl, imidazolinyl, oxazolinyl, thiazolinyl, tetrahydrofuranyl, dihydrofuranyl, tetrahydrothienyl, 1,3-dioxolanyl, piperidinyl, piperazinyl, tetrahydropyranyl, dihydropyranyl, tetrahydrothiopyranyl, 1,3-dioxanyl, 1,4-dioxanyl, 1,3-oxathiolanyl, 1,3-oxathianyl, 1,3-dithianyl, 1,4-oxathiolanyl, 1,4-oxathianyl, 1,4-dithianyl, morpholinyl, thiomorpholinyl, hexahydro-1H-1,4-diazepinyl, azabicylo[3.2.1]octyl, azabicylo[3.3.1]nonyl, azabicylo[4.3.0]nonyl, oxabicylo[2.2.1]heptyl, 1,1-dioxido-tetrahydro-2H-thiopyranyl, and 1,5,9-triazacyclododecyl.

Examples of "4-membered heterocycloalkyl" groups include oxetanyl, thietanyl and azetidinyl.

The term "5-6-membered heterocycloalkyl" represents a non-aromatic, monocyclic group, which is saturated or partially unsaturated, containing 5 or 6 ring atoms, which includes one or two heteroatoms selected independently from oxygen, sulfur, and nitrogen. Illustrative examples of 5 to 6-membered heterocycloalkyl groups include, but are not limited to pyrrolidinyl, piperidinyl, piperazinyl, tetrahydrofuranyl, tetrahydrothienyl, tetrahydropyranyl, tetrahydrothiopyranyl, morpholinyl, and thiomorpholinyl.

"Heteroaryl" represents a group or moiety comprising an aromatic monocyclic or bicyclic radical, containing 5 to 10 ring atoms, including 1 to 4 heteroatoms independently selected from nitrogen, oxygen and sulfur. This term also encompasses bicyclic heterocyclic-aryl groups containing either an aryl ring moiety fused to a heterocycloalkyl ring moiety or a heteroaryl ring moiety fused to a cycloalkyl ring moiety.

Illustrative examples of heteroaryls include, but are not limited to, furanyl, thienyl, pyrrolyl, imidazolyl, pyrazolyl, triazolyl, tetrazolyl, thiazolyl, oxazolyl, isoxazolyl, oxadiazolyl, thiadiazolyl, isothiazolyl, pyridinyl (pyridyl), oxo-pyridyl (pyridyl-N-oxide), pyridazinyl, pyrazinyl, pyrimidinyl, triazinyl, benzofuranyl, isobenzofuryl, 2,3-dihydrobenzofuryl, 1,3-benzodioxolyl, dihydrobenzodioxinyl, benzothienyl, indolizinyl, indolyl, isoindolyl, dihydroindolyl, benzimidazolyl, dihydrobenzimidazolyl, benzoxazolyl, dihydrobenzoxazolyl, benzothiazolyl, benzoisothiazolyl, dihydrobenzoisothiazolyl, indazolyl, imidazopyridinyl, pyrazolopyridinyl, benzotriazolyl, triazolopyridinyl, purinyl, quinolinyl, tetrahydroquinolinyl, isoquinolinyl, tetrahydroisoquinolinyl, quinoxalinyl, cinnolinyl, phthalazinyl, quinazolinyl, 1,5-naphthyridinyl, 1,6-naphthyridinyl, 1,7-naphthyridinyl, 1,8-naphthyridinyl, and pteridinyl.

As used herein, "5-6-membered heteroaryl" represents an aromatic monocyclic group containing 5 or 6 ring atoms, including at least one carbon atom and 1 to 4 heteroatoms independently selected from nitrogen, oxygen and sulfur. Selected 5-membered heteroaryl groups contain one nitrogen, oxygen, or sulfur ring heteroatom, and optionally contain 1, 2, or 3 additional nitrogen ring atoms. Selected 6-membered heteroaryl groups contain 1, 2, or 3 nitrogen ring heteroatoms. Examples of 5-membered heteroaryl groups include furyl (furanyl), thienyl, pyrrolyl, imidazolyl, pyrazolyl, triazolyl, tetrazolyl, thiazolyl, isothiazolyl, thiadiazolyl, oxazolyl, isoxazolyl, oxadiazolyl and oxo-oxadiazolyl. Selected 6-membered heteroaryl groups include pyridinyl, oxo-pyridyl, pyrazinyl, pyrimidinyl, pyridazinyl and triazinyl.

Bicyclic heteroaryl groups include 6,5-fused heteroaryl (9-membered heteroaryl) and 6,6-fused heteroaryl (10-membered heteroaryl) groups. Examples of 6,5-fused heteroaryl (9-membered heteroaryl) groups include benzothienyl, benzofuranyl, indolyl, indolinyl, isoindolyl, isoindolinyl, indazolyl, indolizinyl, isobenzofuryl, 2,3-dihydrobenzofuryl, benzoxazolyl, benzthiazolyl, benzimidazolyl, benzoxadiazolyl, benzthiadiazolyl, benzotriazolyl, 1,3-benzoxathiol-2-on-yl (2-oxo-1,3-benzoxathiolyl), purinyl and imidazopyridinyl.

Examples of 6,6-fused heteroaryl (10-membered heteroaryl) groups include quinolyl, isoquinolyl, phthalazinyl, naphthridinyl (1,5-naphthyridinyl, 1,6-naphthyridinyl, 1,7-naphthyridinyl, 1,8-naphthyridinyl), quinazolinyl, quinoxalinyl, 4H-quinolizinyl, tetrahydroquinolinyl, cinnolinyl, and pteridinyl.

Unless otherwise specified, all bicyclic ring systems may be attached at any suitable position on either ring.

The terms "halogen" and "halo" represent chloro, fluoro, bromo, or iodo substituents. "Oxo" represents a double-bonded oxygen moiety; for example, if attached directly to a carbon atom forms a carbonyl moiety (C=O). "Hydroxy" or "hydroxyl" is intended to mean the radical —OH. As used herein, the term "cyano" refers to the group —CN.

As used herein, the term "optionally substituted" indicates that a group (such as an alkyl, cycloalkyl, alkoxy, heterocycloalkyl, aryl, or heteroaryl group) or ring or moiety (such as a carbocyclic or heterocyclic ring or moiety) may be unsubstituted, or the group, ring or moiety may be substituted with one or more substituent(s) as defined. In the case where groups may be selected from a number of alternative groups, the selected groups may be the same or different.

As used herein, cellulose is referred to as a polymer that comprises a monomer represented by formula:

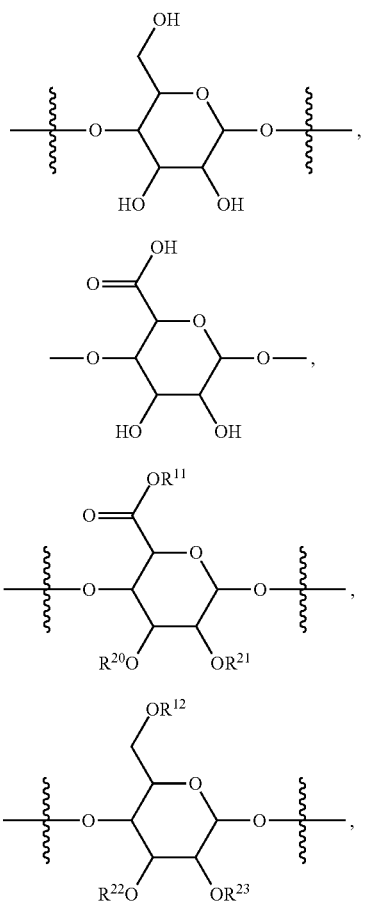

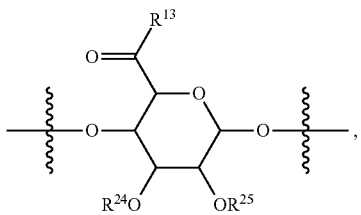

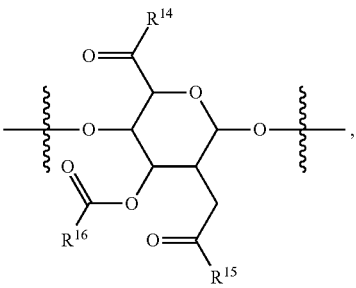

or a combination thereof, wherein $R^{11}$, $R^{12}$, or $R^{20}$-$R^{25}$ are independently H, alkyl, aryl, $(CH_2CH_2O)_nH$, $(CH(CH_3)CH_2O)_nH$, or $(CH_2)_nSi(CH_3)_3$, $R^{13}$-$R^{16}$ is independently H, an amine, or amino groups, and n is an integer of 1-100. In some embodiments, cellulose is a polymer that comprises a glucopyranose monomer.

There are two types of celluloses, unmodified and modified cellulose. Unmodified cellulose as used here is referred to as a polymer that comprises mostly the monomers represented by formula I above. Modified cellulose, on the other hand, is a polymer that contains a monomer in which one, some, or all of the $CH_2OH$ and OH groups within the monomers that make up the cellulose are modified. In other words, a modified cellulose is a polymer that comprises a monomer represented generally by formula II, III, IV, V, and VI. For example, carboxymethyl cellulose (CMC) or cellulose gum is a cellulose derivative with carboxymethyl groups (—$CH_2$—COOH) bound to some of the hydroxyl groups of the glucopyranose monomers that make up the cellulose backbone. CMC may be also represented by its monomer formula

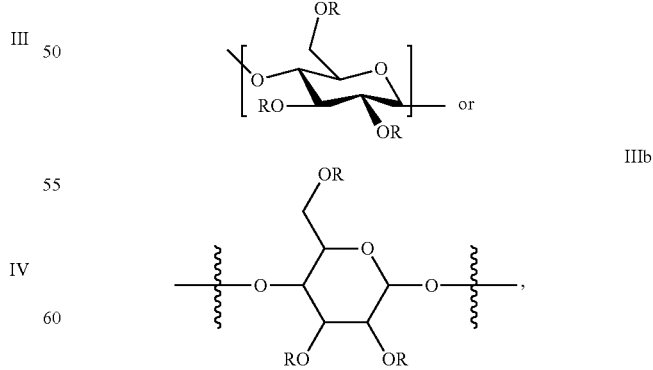

wherein R here is H or $CH_2COOH$. In a specific carboxymethyl cellulose polymer, not every OH group in the polymer or in a specific monomer within the same polymer is associated with a $CH_2COOH$ group. Only some of the OH groups in a carboxymethyl cellulose polymer are associated with a $CH_2COOH$ group. This principle applies to every modified cellulose.

As used herein, a cellulose is also referred to as composition, material, or product that comprises a polymer that in turn comprise an unmodified or modified cellulose monomer. Cellulose, cellulose composition, cellulose material, and cellulose product are used interchangeably in this disclosure. In this disclosure, cellulose includes nanocellulose, microcellulose, modified cellulose, unmodified cellulose, nanocellulose material, microcellulose product, and any type of cellulose.

In some embodiments, an unmodified cellulose may be any material that contains unmodified cellulose or a polymer that still comprises a monomer represented by formula I, such as microcrystalline cellulose (MCC), bleached wood pulp, more broadly including lignocellulosic biomass such as cotton, woody biomass, or straw.

In some other embodiments, an unmodified cellulose may be cellulose-containing materials that are derived from any plant residue and materials that contain unmodified glucose monomer. They also include materials derived from newspaper and waste paper from chemical pulp since these materials also contain cellulose.

As used herein, a "biomass material" is referred to as any material that is originated from any plant and contains cellulose. Examples of such biomass material are cellulose-containing renewable biomass such as forest residues (i.e., wood) or agricultural residues (wheat, barley, and cotton).

As used herein, an "oxidized cellulose" is referred to a cellulose comprising a monomer represented by formula

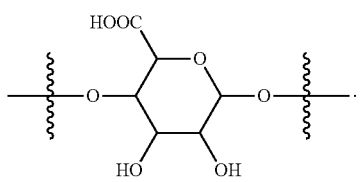 [SMILES: *OC1OC(C(=O)O)C(O*)C(O)C1O]

II

Any material or product that contains such a cellulose is referred to an oxidized cellulose, oxidized cellulose material, oxidized cellulose composition, or oxidized cellulose product, interchangeably.

As used herein, a "modified cellulose" is referred to a cellulose comprising a modified monomer. The unmodified monomer is represented by formula

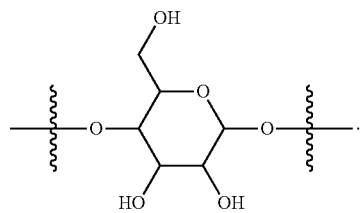

I

The modified monomer of the unmodified monomer is one in which at least one of the $CH_2OH$ group and two OH groups of the unmodified monomer are modified. Any material or product that contains such a modified cellulose is referred to as modified cellulose, modified cellulose composition, modified cellulose material, or modified cellulose product, interchangeably. Accordingly, nanocellulose refers to nanocellulose composition, nanocellulose material, and nanocellulose product as well in this disclosure.

As used herein, a "cellulose derivative" is generally referred to a composition comprising a cellulose, cellulose composition, cellulose material, or cellulose product and at least another ingredient, compound, or agent.

In yet some other embodiments, an unmodified cellulose may also be a modified cellulose or a material containing a modified cellulose. As pointed out above, even a modified cellulose still contains polymers comprising unmodified monomers. A modified cellulose can be subjected to the oxidation process disclosed herein.

In some embodiments, modified celluloses are usually used to produce nanocellulose through a cellulose cleavage process, which is described below. These include carboxylic acid-containing cellulose, commercial carboxylmethyl cellulose (CMC), hydroxyl ethyl cellulose, methyl (or alkyl) cellulose, or hydroxylmethyl propyl cellulose (HMPC). Many different variations of OH-containing cellulose are available. Since the surface modification of cellulose has been well known, other potential modified cellulose could be silicon-containing cellulose whose monomer can be represented by the following formula

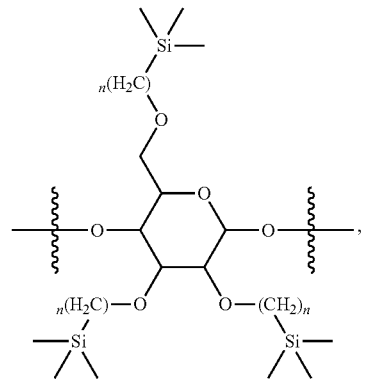

VII wherein n=0-10.

As used herein, a nanocellulose is referred to a cellulose particle, rod, whisker, or fibril whose size in solid state and in at least one dimension is less than 1,000 nm. If the cellulose is of particle type, the nanocellulose is one with a diameter less than about 1,000 nm. If a cellulose is of rod, whisker, or fibril type, the nanocellulose is one whose width is less than about 1,000 nm while its length may or may not be less than 1,000 nm.

Nanocellulose particles, rods, fibrils, or whiskers usually aggregate in solution because of hydrogen bonding interaction and are in a larger size.

As used herein, a nanocellulose is a composition that comprises modified nanocellulose particles, rods, or whiskers.

A microcellulose, on the other hand, is a cellulose whose diameter or width in solid state is greater than 1,000 nm, usually from about 1 to 1,000 μm. Some celluloses have diameter or width greater than 1,000 μm, since most, if not all, of cellulose is originated from plant and cellulose comprises a bundle of cellulose polymers.

In one aspect, this invention provides a method of producing oxidized cellulose. The method comprises contacting an unmodified cellulose at a temperature with an oxidation composition for a period to produce an oxidized cellulose, wherein the oxidation composition comprises an iron-organic acid complex and hydrogen peroxide; and the iron-organic acid complex comprises an iron ion and at least one organic acid. This method and its related methods are referred herein to the oxidation process.

In some embodiments, the unmodified cellulose is a polymer comprising a monomer represented by formula I.

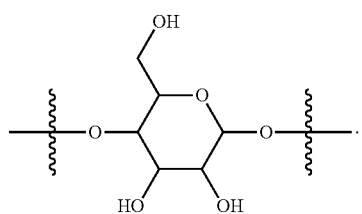

I

In some other embodiments, the unmodified cellulose is a polymer comprising a glucopyranose monomer. In some other embodiments, the unmodified cellulose is a material that contains a polymer comprising a monomer represented by formula I above. The material may be any residue from trees, plants, crops, or biomass. The material may also include those derived from newspaper and waste paper from chemical pulp since these materials also contain cellulose.

In some embodiments, the unmodified cellulose is also a modified cellulose since any modified cellulose still includes polymers that in turn comprise monomers represented by formula I above, especially inside the particles or fibrils that constitute the modified cellulose. Because of its biomass origin and polymeric nature, any modification to a cellulose material does not modify every $CH_2OH$ or OH group. Any modification to cellulose material can only modify those $CH_2OH$, OH, or both on surfaces of particles, rod, whisker, or fibrils. Some monomers on the surfaces and all monomers inside are still unmodified monomers after the modification process. As long as a cellulose material contains a monomer represented by formula I, the cellulose material can be treated by the oxidizing composition, cleavage composition, or any method disclosed herein to produce a cellulose material with more oxidized monomers and reduced particle or fibril size. In other words, any cellulose or cellulose material can be subjected to the oxidation process.

In some other embodiments, the oxidized cellulose is a polymer comprising a monomer represented by formula II,

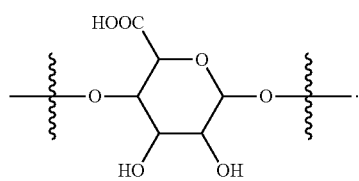

II

The oxidation process described here and the cleavage process described below use an iron-organic acid complex as a catalyst. In some embodiments, this iron-organic acid complex can be prepared separately before its mixing with hydrogen peroxide. In some other embodiments, this complex can be formed in the reaction vessel or container for the oxidation or cleavage process by reacting an iron salt and the at least one organic acid. However, the complex has to be formed before its mixing with hydrogen peroxide.

In some embodiments, the iron ion to form the complex is $Fe^{2+}$, $Fe^{3+}$ ion, or combination thereof. In other embodiments, the iron ion may be other iron ion species with higher charges.

In some embodiments, the iron salts for forming the complex are $Fe(NO_3)_3$, $FeSO_4$, $FeCl_2$, $FeCl_3$, or a combination thereof.

In some embodiments, the at least one organic acid is selected from the group consisting of malonic acid, 2,6-pyridine dicarboxylic acid, oxalic acid, citric acid, tartaric acid, 2-pyridinecarboxylic acid, succinic acid, trimethylglycine, a pyridine carboxylic acid, a salicylic acid and a combination thereof. In some other embodiments, the at least one organic acid is one of malonic acid, 2,6-pyridine dicarboxylic acid, pyridine carboxylic acid, salicylic acid or a combination thereof. In some other embodiments, the at least one organic acid is malonic acid, 2,6-pyridine dicarboxylic acid, or both.

While not wishing to be bound by any theory, the inventor believes that the organic acid in the complex associates with the iron ion through one, two, or more of its oxygen, nitrogen, or other atoms that are able to share its lone pair electrons with one, two, or more empty atomic orbits of the iron atom. Since an iron ion species can have 5 or 6 empty atomic orbits, the lone pair electrons donating atom(s) of the organic acid can occupy 1, 2, or 3 atomic orbits of the iron ion. The rest atomic orbit(s) of the iron atom in the complex are usually occupied by the lone pair electrons donating atom(s) of water or other organic acid. The net charge of the iron-organic acid complex depends on the number of electron donating atoms in the organic acid and the charge state of the other chelating species.

In some embodiments, the at least one organic acid in the complex has one, two, or three atoms that can bind to the iron ion in a bidentate or tridentate mode. For example, an acid represented by formula

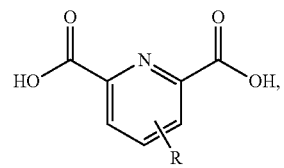

wherein R is H, OH, Cl, Br, $CO_2H$, $NO_2$, an alkyl or aryl group, has three atoms that can bind to iron ion, while an acid represented by one of the following formulas,

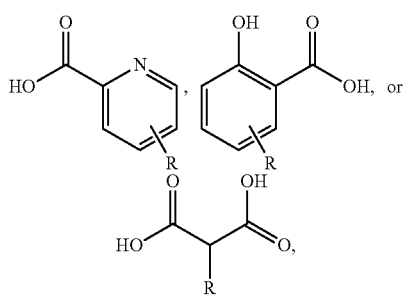

wherein R is H, OH, Cl, Br, $CO_2H$, $NO_2$, an alkyl or aryl group, has two atoms that can bind to iron ion. Similarly, an organic acid that contains two carboxylic acid groups, such as malonic acid, citric acid, and tartaric acid, can have two atoms that can bind to the iron ion in a bidentate or tridentate mode, as well.

In some embodiments, the iron ion in the iron-organic complex has at least one of its atomic orbits occupied by one organic acid. In some embodiments, the iron ion in the iron-organic acid complex has at least two of its atomic orbits occupied by one organic acid. In some embodiments, the iron ion in the iron-organic acid complex has at least three of its atomic orbits occupied by one organic acid. In some embodiments, the iron ion in the iron-organic acid complex has at least one, two, or three of its atomic orbits occupied by one or more organic acids.

While not wishing to be bound by any theory, the inventor believes that the iron-organic complex catalyst and hydrogen peroxide of the oxidation composition or the cleavage composition work together to break the protection layer of lignin in cellulose material, to oxidize the $CH_2OH$ of a monomer to COOH, and to disrupt hydrogen bond network within cellulose particles, fibrils, rods, or whiskers. As a result, the inner polymers are exposed for breakage and oxidation of the $CH_2OH$ reducing the interaction between cellulose polymers, leading to smaller particles, fibrils, rods, or whiskers of a modified or oxidized cellulose.

In some embodiments, the oxidation composition comprises an excess or additional organic acid. This excess or additional organic acid may be the same organic acid that forms the iron-organic acid complex or a different organic acid. In some embodiments, the weight ratio between iron and all organic acids is from about 1:1 to about 1:20, from about 1:1 to about 1:10, from about 1:5 to about 1:15, about 1:1, about 1:20, about 1:5, about 1:10, about 1:15, or about any value there between.

In some embodiments, the cleavage composition contains no excess organic acid after a stable iron-organic acid is formed.

In some embodiments, the temperature for the oxidation process, or the temperature for the cleavage process, or the second temperature for the modification process is usually between from about 30° C. to about 100° C., from about 30° C. to about 90° C., from about 30° C. to about 80° C., from about 30° C. to about 70° C., from about 30° C. to about 60° C., from about 30° C. to about 50° C., from about 30° C. to about 40° C., from about 50° C. to about 100° C., from about 50° C. to about 80° C., from about 50° C. to about 70° C., from about 50° C. to about 60° C., from about 60° C. to about 80° C., or from about 60° C. to about 90° C., about 100° C., about 90° C., about 80° C., about 70° C., about 60° C., about about 50° C., about 50° C., about 40° C., about 30° C., or any value there between. The temperature for the whole oxidation process, the whole cleavage process, or the modification process can vary from the beginning to the end.

In some embodiments, the period for the whole oxidation process, the period for the whole cleavage process, or the second period for the modification process is from about 30 minutes to about 5 days, about 1 hour, about 2 hours, about 3 hours, about 5 hours, about 10 hours, about 15 hours, about 20 hours, about 1 day, about 2 days, about 3 days, about 4 days, about 5 days, or even longer, including any ranges there between. In some embodiments, the period for the whole oxidation process depends on a number of factors, such as the size of the starting material or the particle size of the finishing product. Usually, the oxidation process lasts until a certain level of oxidation or yield is achieved.

In some embodiments, the iron-organic acid complex is present in the oxidation composition or in the cleavage composition at a concentration of from about 0.001 wt % to about 10 wt %, from 0.001 wt % to about 0.005 wt %, from 0.001 wt % to about 0.01 wt %, from 0.001 wt % to about 0.05 wt %, from 0.001 wt % to about 0.1 wt %, from 0.001 wt % to about 0.5 wt %, from 0.001 wt % to about 1 wt %, from 0.001 wt % to about 5 wt %, from 0.001 wt % to about 8 wt %, from 0.01 wt % to about 0.05 wt %, from 0.01 wt % to about 0.05 wt %, from 0.01 wt % to about 0.1 wt %, from 0.01 wt % to about 0.5 wt %, from 0.01 wt % to about 1 wt %, from 0.01 wt % to about 2 wt %, from 0.01 wt % to about 3 wt %, from 0.01 wt % to about 5 wt %, from 0.01 wt % to about 7 wt %, from 0.01 wt % to about 9 wt %, from 0.05 wt % to about 0.5 wt %, from 0.05 wt % to about 1 wt %, from 0.05 wt % to about 2 wt %, from 0.05 wt % to about 4 wt %, from 0.05 wt % to about 6 wt %, from 0.05 wt % to about 8 wt %, from 0.05 wt % to about 10 wt %, from 0.1 wt % to about 0.5 wt %, from 0.1 wt % to about 1 wt %, from 0.1 wt % to about 2 wt %, from 0.1 wt % to about 4 wt %, from 0.1 wt % to about 6 wt %, from 0.1 wt % to about 8 wt %, from 0.1 wt % to about 10 wt %, from 0.5 wt % to about 1 wt %, from 0.5 wt % to about 2 wt %, from 0.5 wt % to about 4 wt %, from 0.5 wt % to about 6 wt %, from 0.5 wt % to about 8 wt %, from 0.5 wt % to about 10 wt %, from 1 wt % to about 3 wt %, from 1 wt % to about 5 wt %, from 1 wt % to about 8 wt %, from 1 wt % to about 10 wt %, from 3 wt % to about 5 wt %, from 3 wt % to about 8 wt %, from 3 wt % to about 10 wt %, from 5 wt % to about 8 wt %, from 5 wt % to about 10 wt %, from 7 wt % to about 10 wt %, about 0.005%, about 0.01%, about 0.05%, about 0.1%, about 0.5%, about 1%, about 2%, about 4%, about 6%, about 8%, or about 10, including any ranges there between.

In some embodiments, the hydrogen peroxide is present in the oxidation composition or in the cleavage composition at a concentration of from about 0.1 wt % to about 50 wt %, from 0.1 wt % to about 45 wt %, from 0.1 wt % to about 35 wt %, from 0.1 wt % to about 30 wt %, from 0.1 wt % to about 25 wt %, from 0.1 wt % to about 20 wt %, from 0.1 wt % to about 15 wt %, from 0.1 wt % to about 10 wt %, from 0.1 wt % to about 5 wt %, from 0.1 wt % to about 3 wt %, from 0.1 wt % to about 1 wt %, from 0.5 wt % to about 1 wt %, from 0.5 wt % to about 2 wt %, from 0.5 wt % to about 3 wt %, from 0.5 wt % to about 5 wt %, from 0.5 wt % to about 7 wt %, from 0.5 wt % to about 10 wt %, from 0.5 wt % to about 15 wt %, from 0.5 wt % to about 20 wt %, from 1 wt % to about 5 wt %, from 1 wt % to about 10 wt %, from 1 wt % to about 15 wt %, from 5 wt % to about 15 wt %, from 5 wt % to about 10 wt %, about 0.1%, about 0.3%, about 0.5%, about 0.7%, about 0.9%, about 1%, about 3%, about 5%, about 7%, about 9%, about 11%, about 13%, or about 15%, including any ranges there between.

In some embodiments, the oxidized cellulose is a microcellulose, nanocellulose, or a combination thereof. In some other embodiments, the oxidized cellulose is a product of particles whose diameter, measured by AFM or SEM in solid state, is less than 1 μm, less than 900 nm, less than 800 nm, less than 700 nm, less than 600 nm, less than 500 nm, less than 400 nm, less than 300 nm, less than 200 nm, less than 150 nm, less than 100 nm, less than 50 nm, or less than 30 nm, including any ranges there between. In some other embodiments, the oxidized cellulose is a product of particles whose diameter, measured by AFM or SEM in solid state, has a distribution of from about 5 μm to about 1 μm, from about 5 μm to about 0.8 μm, from about 5 μm to about 0.6 μm, from about 5 μm to about 0.4 μm, from about 5 μm to about 0.2 μm, from about 5 μm to about 0.1 μm, from about 5 μm to about 0.05 μm, from about 1 μm to about 0.8 μm, from about 1 μm to about 0.6 μm, from about 1 μm to about 0.4 µm, from about 1 µm to about 0.2 µm, from about 1 µm to about 0.1 µm, from about 1 µm to about 0.05 µm, from about 0.9 µm to about 0.1 µm, from about 0.9 µm to about 0.8 µm, from about 0.9 µm to about 0.6 µm, from about 0.9 µm to about 0.4 µm, from about 0.9 µm to about 0.2 µm, from about 0.9 µm to about 0.1 µm, from about 0.9 µm to about 0.05 µm, from about 0.7 µm to about 0.6 µm, from about 0.7 µm to about 0.4 µm, from about 0.7 µm to about 0.2 µm, from about 0.7 µm to about 0.1 µm, from about 0.7 µm to about 0.05 µm, from about 0.5 µm to about 0.4 µm, from about 0.5 µm to about 0.2 µm, from about 0.5 µm to about 0.1 µm, from about 0.5 µm to about 0.05 µm, from about 0.3 µm to about 0.2 µm, from about 0.3 µm to about 0.1 µm, from about 0.3 µm to about 0.05 µm, from about 0.3 µm to about 0.2 µm, from about 0.3 µm to about 0.1 µm, or from about 0.3 µm to about 0.05 µm, including any ranges there between.

In some embodiments, the oxidized cellulose is of the size or distribution of the starting unmodified cellulose. In some embodiments, the oxidized cellulose has reduced size or size distribution, compared to ones of the starting modified cellulose.

In some embodiments, the oxidized cellulose is of the size of about 10 µm, 9 µm, 8 µm, 7 µm, 5 µm, 3 µm, 2 µm, or about any ranges or values there between.

In some embodiments, the oxidized nanocellulose is a product of rod or whisker whose diameter or length, measured by AFM or SEM in solid state, is independently less than 1 µm, less than 900 nm, less than 800 nm, less than 700 nm, less than 600 nm, less than 500 nm, less than 400 nm, less than 300 nm, less than 200 nm, less than 150 nm, less than 100 nm, less than 50 nm, or less than 30 nm. In some other embodiments, the oxidized cellulose is a product of rod or whisker whose diameter or length, measured by AFM or SEM in solid state, has a distribution of from about 5 µm to about 1 µm, from about 5 µm to about 0.8 µm, from about 5 µm to about 0.6 µm, from about 5 µm to about 0.4 µm, from about 5 µm to about 0.2 µm, from about 5 µm to about 0.1 µm, from about 5 µm to about 0.05 µm, from about 1 µm to about 0.8 µm, from about 1 µm to about 0.6 µm, from about 1 µm to about 0.4 µm, from about 1 µm to about 0.2 µm, from about 1 µm to about 0.1 µm, from about 1 µm to about 0.05 µm, from about 0.9 µm to about 0.1 µm, from about 0.9 µm to about 0.8 µm, from about 0.9 µm to about 0.6 µm, from about 0.9 µm to about 0.4 µm, from about 0.9 µm to about 0.2 µm, from about 0.9 µm to about 0.1 µm, from about 0.9 µm to about 0.05 µm, from about 0.7 µm to about 0.6 µm, from about 0.7 µm to about 0.4 µm, from about 0.7 µm to about 0.2 µm, from about 0.7 µm to about 0.1 µm, from about 0.7 µm to about 0.05 µm, from about 0.5 µm to about 0.4 µm, from about 0.5 µm to about 0.2 µm, from about 0.5 µm to about 0.1 µm, from about 0.5 µm to about 0.05 µm, from about 0.3 µm to about 0.2 µm, from about 0.3 µm to about 0.1 µm, from about 0.3 µm to about 0.05 µm, from about 0.3 µm to about 0.2 µm, from about 0.3 µm to about 0.1 µm, or from about 0.3 µm to about 0.05 µm, including any ranges there between.

In some embodiments, the oxidation composition for the oxidation process further comprises an inorganic acid. In some embodiments, the inorganic acid is sulfuric acid, nitric acid, hydrogen chloric acid, phosphoric acid, hydrogen phosphate, perchloric acid, sulfonic acid, fluoroboric acid, fluoro sulfonic acid hexaflurorphosphoric acid, sulfonic acid, alkyl sulfonic acid, alkyl phosphonic acid, alkyl hydrogen phosphonic acid, dihydrogen phosphate, or a combination thereof.

In some embodiments, the inorganic acid is present in oxidation composition at a concentration of from about 0.001 wt % to about 20 wt %, from about 0.001 wt % to about 0.002 wt %, from about 0.001 wt % to about 0.005 wt %, from about 0.001 wt % to about 0.01 wt %, from about 0.001 wt % to about 0.05 wt %, from about 0.001 wt % to about 0.1 wt %, from about 0.001 wt % to about 0.5 wt %, from about 0.001 wt % to about 1 wt %, from about 0.001 wt % to about 5 wt %, from about 0.001 wt % to about 10 wt %, from about 0.001 wt % to about 15 wt %, from about 0.001 wt % to about 20 wt %, from about 0.005 wt % to about 0.1 wt %, from about 0.005 wt % to about 0.5 wt %, from about 0.005 wt % to about 1 wt %, from about 0.005 wt % to about 5 wt %, from about 0.005 wt % to about 10 wt %, from about 0.005 wt % to about 15 wt %, from about 0.005 wt % to about 20 wt %, from about 0.01 wt % to about 0.5 wt %, from about 0.01 wt % to about 1 wt %, from about 0.01 wt % to about 5 wt %, from about 0.01 wt % to about 10 wt %, from about 0.01 wt % to about 15 wt %, from about 0.01 wt % to about 20 wt %, from about 0.5 wt % to about 1 wt %, from about 0.5 wt % to about 5 wt %, from about 0.5 wt % to about 10 wt %, from about 0.5 wt % to about 15 wt %, from about 0.5 wt % to about 20 wt %, from about 1 wt % to about 5 wt %, from about 1 wt % to about 10 wt %, from about 1 wt % to about 15 wt %, from about 1 wt % to about 20 wt %, from about 5 wt % to about 10 wt %, or from about 5 wt % to about 15 wt %, from about 5 wt % to about 20 wt %, including any ranges there between.

In some embodiments, the inorganic acid is present in oxidation composition at a concentration of about 0.001%, about 0.005, about 0.01%, about 0.05%, about 0.1%, about 0.5%, about 1%, about 5%, about 10%, about 15%, about 20%, about 25%, about 30%, about 35%, about 40%.

In some embodiments, the oxidation composition for the oxidation process or the cleavage composition for the cleavage process further comprises an inorganic salt. In some embodiments, the inorganic salt is sodium bisulfate, sodium sulfate, an alkali metal sulfate, an alkali metal bisulfate, an alkaline earth metal sulfate, alkaline earth metal bisulfate, or a combination thereof.

In some embodiments, the inorganic salt is present in the oxidation composition or in the cleavage composition at a concentration of from about 0.001 wt % to about 30 wt %, from about 0.001 wt % to about 0.002 wt %, from about 0.001 wt % to about 0.005 wt %, from about 0.001 wt % to about 0.01 wt %, from about 0.001 wt % to about 0.05 wt %, from about 0.001 wt % to about 0.1 wt %, from about 0.001 wt % to about 0.5 wt %, from about 0.001 wt % to about 1 wt %, from about 0.001 wt % to about 5 wt %, from about 0.001 wt % to about 10 wt %, from about 0.001 wt % to about 15 wt %, from about 0.001 wt % to about 20 wt %, from about 0.001 wt % to about 25 wt %, from about 0.001 wt % to about 30 wt %, from about 0.005 wt % to about 0.1 wt %, from about 0.005 wt % to about 0.5 wt %, from about 0.005 wt % to about 1 wt %, from about 0.005 wt % to about 5 wt %, from about 0.005 wt % to about 10 wt %, from about 0.005 wt % to about 15 wt %, from about 0.005 wt % to about 20 wt %, from about 0.005 wt % to about 25 wt %, from about 0.005 wt % to about 30 wt %, from about 0.01 wt % to about 0.5 wt %, from about 0.01 wt % to about 1 wt %, from about 0.01 wt % to about 5 wt %, from about 0.01 wt % to about 10 wt %, from about 0.01 wt % to about 15 wt %, from about 0.01 wt % to about 20 wt %, from about 0.01 wt % to about 25 wt %, from about 0.01 wt % to about 30 wt %, from about 0.5 wt % to about 1 wt %, from about 0.5 wt % to about 5 wt %, from about 0.5 wt % to about 10 wt %, from about 0.5 wt % to about 15 wt %, from about 0.5 wt % to about 20 wt %, from about 0.5 wt % to about 25 wt %, from about 0.5 wt % to about 30 wt %, from about 1 wt % to about 5 wt %, from about 1 wt % to about 10 wt %, from about 1 wt % to about 15 wt %, from about 1 wt % to about 20 wt %, from about 1 wt % to about 25 wt %, from about 1 wt % to about 30 wt %, from about 5 wt % to about 10 wt %, from about 5 wt % to about 15 wt %, from about 5 wt % to about 20 wt %, from about 5 wt % to about 25 wt %, from about 5 wt % to about 30 wt %, or any ranges there between.

In some embodiments, the inorganic salt is present in the oxidation composition or the cleavage composition at a concentration of from about 0.5 wt % to about 2.5 wt %, from about 1.5 wt % to about 2.5 wt %, from about 0.5 wt % to about 1.5 wt %, about 0.001 wt %, about 0.005 wt %, about 0.5 wt %, about 2.5 wt %, about 1.5 wt %, about 0.01 wt %, about 0.05 wt %, about 0.1 wt %, about 0.5 wt %, about 1 wt %, about 5 wt %, about 10 wt %, about 15 wt %, about 20 wt %, about 25 wt %, about 30 wt %, or about any value there between.

In some embodiments, the weight ratio between the iron catalyst and the salt in the oxidation composition is from about 3:1 to about 1:3, from about 2:1 to about 1:2, about 3:1, about 2:1, about 1:1, about 1:2, or about 1:3.

In some embodiments, the weight ratio between the iron catalyst and the salt in the cleavage composition is from about 1:1 to about 1:20, from about 1:1 to about 1:10, about 1:5, about 1:15, about 1:2, about 1:5, about 1:10, about 1:15, about 1:20, or about any value there between. Usually, cellulose cleavage process is slow without salt and more salt leads to more cleavage.

In another aspect, the present invention provides a method of producing an oxidized nanocellulose. The method comprises contacting an oxidized cellulose with a cleavage composition at a temperature for a period to form an oxidized nanocellulose, wherein the cleavage composition comprises an iron-organic complex and hydrogen peroxide; and the iron-organic acid complex comprises an iron ion and at least one organic acid. This method is also referred to as the cleavage process.

In some embodiments, the method further comprises contacting the oxidized cellulose or the oxidized nanocellulose with a modification composition at a second temperature for a second period to form a modified cellulose or modified nanocellulose, wherein the modification composition comprises (a) a modification agent and (b) an acid. This step is also referred to as the modification process.

In some embodiments, the modification agent is one that can modify an OH group under an acidic condition, as one skilled in the art would understand. In some embodiments, the modification agent is an alcohol, amine, peptide, amino acid, carboxylic acid anhydride, or combination thereof.

In some embodiments, the oxidized cellulose or oxidized nanocellulose is a polymer comprising a monomer represented by formula II,

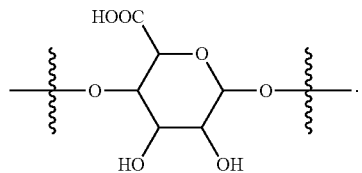 [SMILES: *OC1OC(C(=O)O)C(O*)C(O)C1O]

In some embodiments, the modified cellulose or modified nanocellulose is a polymer comprising a monomer represented by formula

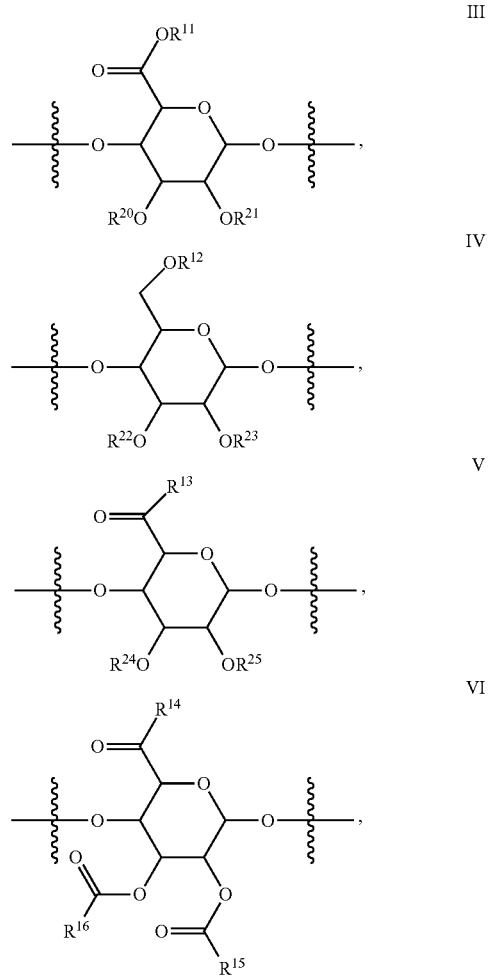

or a combination thereof, wherein $R^{11}$, $R^{12}$, or $R^{20}$-$R^{25}$ are independently H, substituted or unsubstituted alkyl, substituted or un-substituted aryl, $(CH_2CH_2O)_nH$, $(CH(CH_3)CH_2O)_nH$, or $(CH_2)_nSi(CH_3)_3$, $R^{13}$-$R^{16}$ are independently H, an amine, or amino groups, and n is an integer of 1-100.

In some embodiments, the modified cellulose is hydroxylethyl cellulose, methyl cellulose, carboxymethyl cellulose, or a combination thereof.

In some embodiments, the temperature for the cleavage process or the second temperature for the modification process is similar to one used in the oxidation process, as previously described.

In some embodiments, the period for the cleavage process or the second period for the modification process is similar to one for the oxidation process, as described earlier.

In some embodiments, the modified cellulose is a microcellulose, nanocellulose, or a combination thereof.

In some embodiments, the started oxidized cellulose is of size of greater than 1 μm or 5 μm. In some other embodiments, the resulted modified nanocellulose is a product of particles whose diameter, measured by AFM or SEM in solid state, is less than 1 μm, less than 900 nm, less than 800 nm, less than 700 nm, less than 600 nm, less than 500 nm, less than 400 nm, less than 300 nm, less than 200 nm, less than 150 nm, less than 100 nm, less than 50 nm, or less than 30 nm. In some other embodiments, the modified nanocellulose is a product of particles whose diameter, measured by AFM or SEM in solid state, has a distribution of from about 5 μm to about 1 μm, from about 5 μm to about 0.8 μm, from about 5 μm to about 0.6 μm, from about 5 μm to about 0.4 μm, from about 5 μm to about 0.2 μm, from about 5 μm to about 0.1 μm, from about 5 μm to about 0.05 μm, from about 1 μm to about 0.8 μm, from about 1 μm to about 0.6 μm, from about 1 μm to about 0.4 μm, from about 1 μm to about 0.2 μm, from about 1 μm to about 0.1 μm, from about 1 μm to about 0.05 μm, from about 0.9 μm to about 0.1 μm, from about 0.9 μm to about 0.8 μm, from about 0.9 μm to about 0.6 μm, from about 0.9 μm to about 0.4 μm, from about 0.9 μm to about 0.2 μm, from about 0.9 μm to about 0.1 μm, from about 0.9 μm to about 0.05 μm, from about 0.7 μm to about 0.6 μm, from about 0.7 μm to about 0.4 μm, from about 0.7 μm to about 0.2 μm, from about 0.7 μm to about 0.1 μm, from about 0.7 μm to about 0.05 μm, from about 0.5 μm to about 0.4 μm, from about 0.5 μm to about 0.2 μm, from about 0.5 μm to about 0.1 μm, from about 0.5 μm to about 0.05 μm, from about 0.3 μm to about 0.2 μm, from about 0.3 μm to about 0.1 μm, from about 0.3 μm to about 0.05 μm, from about 0.3 μm to about 0.2 μm, from about 0.3 μm to about 0.1 μm, or from about 0.3 μm to about 0.05 μm, including any ranges there between.

In some other embodiments, the resulted modified nanocellulose is a product of rod or whisker whose width or length, measured by AFM or SEM in solid state, is less than 1 μm, less than 900 nm, less than 800 nm, less than 700 nm, less than 600 nm, less than 500 nm, less than 400 nm, less than 300 nm, less than 200 nm, less than 150 nm, less than 100 nm, less than 50 nm, or less than 30 nm. In some other embodiments, the modified nanocellulose is a product of rod or whisker whose width or length, measured by AFM or SEM in solid state, has a distribution of from about 5 μm to about 1 μm, from about 5 μm to about 0.8 μm, from about 5 μm to about 0.6 μm, from about 5 μm to about 0.4 μm, from about 5 μm to about 0.2 μm, from about 5 μm to about 0.1 μm, from about 5 μm to about 0.05 μm, from about 1 μm to about 0.8 μm, from about 1 μm to about 0.6 μm, from about 1 μm to about 0.4 μm, from about 1 μm to about 0.2 μm, from about 1 μm to about 0.1 μm, from about 1 μm to about 0.05 μm, from about 0.9 μm to about 0.1 μm, from about 0.9 μm to about 0.8 μm, from about 0.9 μm to about 0.6 μm, from about 0.9 μm to about 0.4 μm, from about 0.9 μm to about 0.2 μm, from about 0.9 μm to about 0.1 μm, from about 0.9 μm to about 0.05 μm, from about 0.7 μm to about 0.6 μm, from about 0.7 μm to about 0.4 μm, from about 0.7 μm to about 0.2 μm, from about 0.7 μm to about 0.1 μm, from about 0.7 μm to about 0.05 μm, from about 0.5 μm to about 0.4 μm, from about 0.5 μm to about 0.2 μm, from about 0.5 μm to about 0.1 μm, from about 0.5 μm to about 0.05 μm, from about 0.3 μm to about 0.2 μm, from about 0.3 μm to about 0.1 μm, from about 0.3 μm to about 0.05 μm, from about 0.3 μm to about 0.2 μm, from about 0.3 μm to about 0.1 μm, or from about 0.3 μm to about 0.05 μm, including any ranges there between.

In some embodiments, the modification agent in the modification process is an alcohol. In some other embodiments, the modification agent in the modification process is methanol, ethanol, 1-propanol, 2-isopropanol, 1-butanol, 2-butanol, t-butanol, benzyl alcohol, or a mixture thereof.

In some embodiments, the modification agent is an amine. In some other embodiments, wherein the modification agent is $NHR^3R^4$, where $R^3$ and $R^4$ is independently H, a $C_1$-$C_{20}$ substituted or unsubstituted alkyl or aryl group.

In yet some embodiments, the modification agent is acetic anhydride, propionic anhydride, butyric anhydride, camphoric anhydride, citraconic anhydride, diglycolic anhydride, isobutyric anhydride, methoxyacetic anhydride, 3-methylglutaric anhydride, isovaleric anhydride, succinic anhydride, maleic anhydride, or combination thereof.

In some embodiments, the modification agent is a peptide. In some other embodiments, the modification agent is Arginine-Glycine-Aspartic peptide.

In some embodiments, the acid in the modification process is sulfuric acid, nitric acid, hydrogen chloric acid, phosphoric acid, hydrogen phosphate, fluoroboric acid, fluoro sulfonic acid, dihydrogen phosphate, or a mixture thereof.

In some embodiments, the modification agent is present in the modification composition at a concentration of from about 1 wt % to about 99 wt %, from about 1 wt % to about 90 wt %, from about 1 wt % to about 80 wt %, from about 1 wt % to about 70 wt %, from about 1 wt % to about 60 wt %, from about 1 wt % to about 50 wt %, from about 1 wt % to about 40 wt %, from about 1 wt % to about 30 wt %, from about 1 wt % to about 20 wt %, from about 1 wt % to about 10 wt %, from about 10 wt % to about 90 wt %, from about 10 wt % to about 80 wt %, from about 10 wt % to about 70 wt %, from about 10 wt % to about 60 wt %, from about 10 wt % to about 50 wt %, from about 10 wt % to about 40 wt %, from about 10 wt % to about 30 wt %, from about 10 wt % to about 20 wt %, from about 20 wt % to about 90 wt %, from about 20 wt % to about 80 wt %, from about 20 wt % to about 70 wt %, from about 20 wt % to about 60 wt %, from about 20 wt % to about 50 wt %, from about 20 wt % to about 40 wt %, from about 20 wt % to about 30 wt %, from about 20 wt % to about 30 wt %, from about 30 wt % to about 90 wt %, from about 30 wt % to about 80 wt %, from about 30 wt % to about 70 wt %, from about 30 wt % to about 60 wt %, from about 30 wt % to about 50 wt %, from about 30 wt % to about 40 wt %, from about 40 wt % to about 90 wt %, from about 40 wt % to about 80 wt %, from about 40 wt % to about 70 wt %, from about 40 wt % to about 60 wt %, from about 40 wt % to about 50 wt %, from about 50 wt % to about 90 wt %, from about 50 wt % to about 80 wt %, from about 50 wt % to about 70 wt %, from about 50 wt % to about 60 wt %, from about 60 wt % to about 90 wt %, from about 60 wt % to about 80 wt %, from about 60 wt % to about 70 wt %, from about 70 wt % to about 90 wt %, from about 70 wt % to about 80 wt %, or from about 80 wt % to about 90 wt %, including any ranges there between.

In some embodiments, the modification agent is present in the modification composition at a concentration of about 1 wt %, about 10 wt %, about 15 wt %, about 20 wt %, 25 wt %, about 30 wt %, 35 wt %, about 40 wt %, about 45 wt %, about 50 wt %, 55 wt %, about 60 wt %, 65 wt %, about 70 wt %, about 75 wt %, about 80 wt %, 85 wt %, about 95 wt %, or about 99% wt %.

In some embodiments, the acid is present in the modification composition at a concentration of from about 0.0001 wt % to about 10 wt %, from about 0.001 wt % to about 0.002 wt %, from about 0.001 wt % to about 0.005 wt %, from about 0.001 wt % to about 0.01 wt %, from about 0.001 wt % to about 0.05 wt %, from about 0.001 wt % to about 0.1 wt %, from about 0.001 wt % to about 0.5 wt %, from about 0.001 wt % to about 1 wt %, from about 0.001 wt % to about 5 wt %, from about 0.001 wt % to about 8 wt %, from about 0.005 wt % to about 0.1 wt %, from about 0.005 wt % to about 0.01 wt %, from about 0.005 wt % to about 0.05 wt %, from about 0.005 wt % to about 0.1 wt %, from about 0.005 wt % to about 0.5 wt %, from about 0.005 wt % to about 1 wt %, from about 0.005 wt % to about 5 wt %, from about 0.005 wt % to about 10 wt %, from about 0.005 wt % to about 15 wt %, from about 0.005 wt % to about 18 wt %, from about 0.01 wt % to about 0.05 wt %, from about 0.01 wt % to about 0.1 wt %, from about 0.01 wt % to about 0.5 wt %, from about 0.005 wt % to about 1 wt %, from about 0.01 wt % to about 5 wt %, from about 0.01 wt % to about 10 wt %, from about 0.01 wt % to about 10 wt %, from about 0.01 wt % to about 18 wt %, from about 0.5 wt % to about 1 wt %, from about 0.5 wt % to about 5 wt %, from about 0.5 wt % to about 10 wt %, from about 0.5 wt % to about 15 wt %, from about 0.5 wt % to about 18 wt %, from about 1 wt % to about 5 wt %, from about 1 wt % to about 10 wt %, from about 1 wt % to about 15 wt %, from about 5 wt % to about 10 wt %, from about 5 wt % to about 15 wt %, from about 10 wt % to about 15 wt %, or from about 15 wt % to about 18 wt %, including any ranges there between.

In some embodiments, the acid is present in the modification composition at a concentration of about 0.001%, about 0.005, about 0.01%, about 0.05%, about 0.1%, about 0.5%, about 1%, about 5%, about 10%, about 18%, or about 20%.

In some embodiments, the temperature for the cleavage process or the second temperature for the modification process is similar to one used for the oxidation process, as previously described.

In some embodiments, the modified nanocellulose has a similar shape or dimension as the oxidized nanocellulose as previously described. As the result of the cleavage process, the modified cellulose or modified nanocellulose generally has a smaller size than the starting oxidized cellulose subjected to the cleavage process.

In yet another aspect, the present invention provides a cellulose or nanocellulose composition. The cellulose or nanocellulose composition is produced by any one of the methods disclosed here, i.e., the oxidation process, the cleavage process, the modification process, or a combination thereof, depending on the starting cellulose size or characteristics. In some embodiments, the cellulose or nanocellulose composition is produced by the oxidation processes described above. In some other embodiments, the cellulose or nanocellulose composition is produced by the oxidation process and the cleavage process. In some other embodiments, the cellulose or nanocellulose composition is produced by the oxidation process, the cleavage process, and the modification process. In some other embodiments, the cellulose or nanocellulose composition is produced by the cleavage process and the modification process.

In another aspect, the present invention also provides a cellulose complex composition, cellulose derivative, a nanocellulose complex composition, or nanocellulose derivative. These complexes or derivatives comprise a cellulose or nanocellulose composition produced by any one of the methods disclosed herein and one or more additional functional ingredients.

In some embodiments, the cellulose composition in the cellulose complex or cellulose derivative is a nanocellulose composition produced by a combination of the cleavage process or the cleavage process and the modification process.

In some embodiments, the one or more additional functional ingredients are a metal oxide, oil, protein, pharmaceutical active agent, metal ion, metal-ligand complex, antibody, enzyme, antigen, or combination thereof.

In some embodiments, the one or more functional ingredients are selected from the group consisting of titanium oxide, zinc oxide, copper oxide, silver oxide, gold oxide, platinum oxide, aluminum oxide, arsenic oxide, cerium oxide, silicon oxide, ruthenium oxide, palladium oxide, nickel oxide, iridium oxide, rhodium oxide, zirconium oxide, vanadium oxide, molybdenum oxide, indium oxide, gallium oxide, tungsten oxide, or combination thereof.

In other embodiments, the one or more functional ingredients are a metal ion or metal-ligand complex of Fe, Cu, Zn, Co, Ni, Ag, Ru, Mo, Rh, Ir, Mn, Pt, Pd, or a combination thereof.

In another aspect, the present invention provides a method of reducing the particle or fibril size of a cellulose composition. The method comprises contacting a cellulose composition with the oxidation composition, the cleavage composition, or the modification as used in any of the methods disclosed. In some embodiments, the cellulose composition is contacted by the oxidation composition and the cleavage composition as in the methods described above. In some embodiments, the cellulose composition is contacted by the cleavage composition as in the methods described above. In some other embodiments, the cellulose composition is contacted by the oxidation composition, the cleavage composition, and modification composition as in the methods described above. In some other embodiments, the cellulose or nanocellulose composition is produced by the cleavage process and the modification process.

In another aspect, the present invention provides a method of reducing the particle or fibril size of a cellulose composition. The method comprises applying the cleavage process described, the cleavage process and the modification process, the oxidation process, the cleavage process and the modification, or the oxidation process and cleavage process to a cellulose composition.

In yet another aspect, the present invention provides a method of producing a cellulose composition from a biomass material. In some embodiments, the method comprises contacting the biomass material by the oxidation composition as used in any one of the methods disclosed to produce an oxidized cellulose product. In some embodiments, the method further comprises contacting the oxidized cellulose product with a cleavage composition and/or modification composition as used in any one of the methods described.

The disclosed methods to produce modified celluloses do not contain any toxic material or large amount of strong acids as in the prior art. As a result, the produced cellulose or nanocellulose materials do not need intensive and costly purification before they can be used, in any capacity, alone or in combination with other compounds or material, inside a human or animal body or in a composition intended for human or animal consumption or use. They are safe and biocompatible.

The disclosed methods herein also yield a cellulose product with a higher content of nanocellulose than at least some methods in the prior art. In the prior art, mechanical force was used to cleave oxidized cellulose to produce oxidized nanocellulose called cellulose nanofibrils (CNF). The disclosed methods here use chemical force of the oxidation and cleavage compositions.

Previously, any modification to a cellulose material makes the modification on the surfaces of cellulose particles or fibrils. The present invention utilizes the oxidation power of hydrogen peroxide to break the protective layer of lignin and make modifications to more cellulose polymers, leading to smaller size particles or fibrils at the same time.

The present invention is further illustrated by the following examples which should not be considered as limiting in any way.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Exemplary Preparation of Iron Catalyst, Source of Raw Material, and Instruments

5% Fe(DPA)(CTA) in water was prepared by mixing of 5 wt % $Fe(NO_3)_3(H_2O)_9$ with 1 equivalent of pyridine-2,6-dicarboxylic acid (DPA) and 3 equivalents of citric acid (CTA) in water. After stirring for 30 minutes at room temperature, the resultant reddish brown solution was adjusted to between pH 2-3 using 20% NaOH.

Avicel PH101 or Type 102 cellulose has been used as microcrystalline cellulose. Carboxy methylcellulose (CMC) CL611 is from FMC Corporation and Methocel is from Dow chemical company. Bleached hardwood pulp and softwood pulp were provided from Verso Corp. and Dixie Paper Co. Inc., respectively. Iron (II,III) oxide powder (<5 μm) and anhydrous sodium bisulfate have been purchased from Sigma Aldrich. SEM and AFM images were obtained using Hitachi SU1510 and Asylum Research MFP-3D, respectively. Solid content of a cellulose hydrogel was obtained by first using a freeze drying method or drying in an oven at 60° C. overnight, then using the formula of "the solid content= (weight of the solid content after drying)/(total weight of the cellulose hydrogel before drying)×100."

Example 2

Preparation of Carboxymethyl Nanocellulose

Figure 1B:
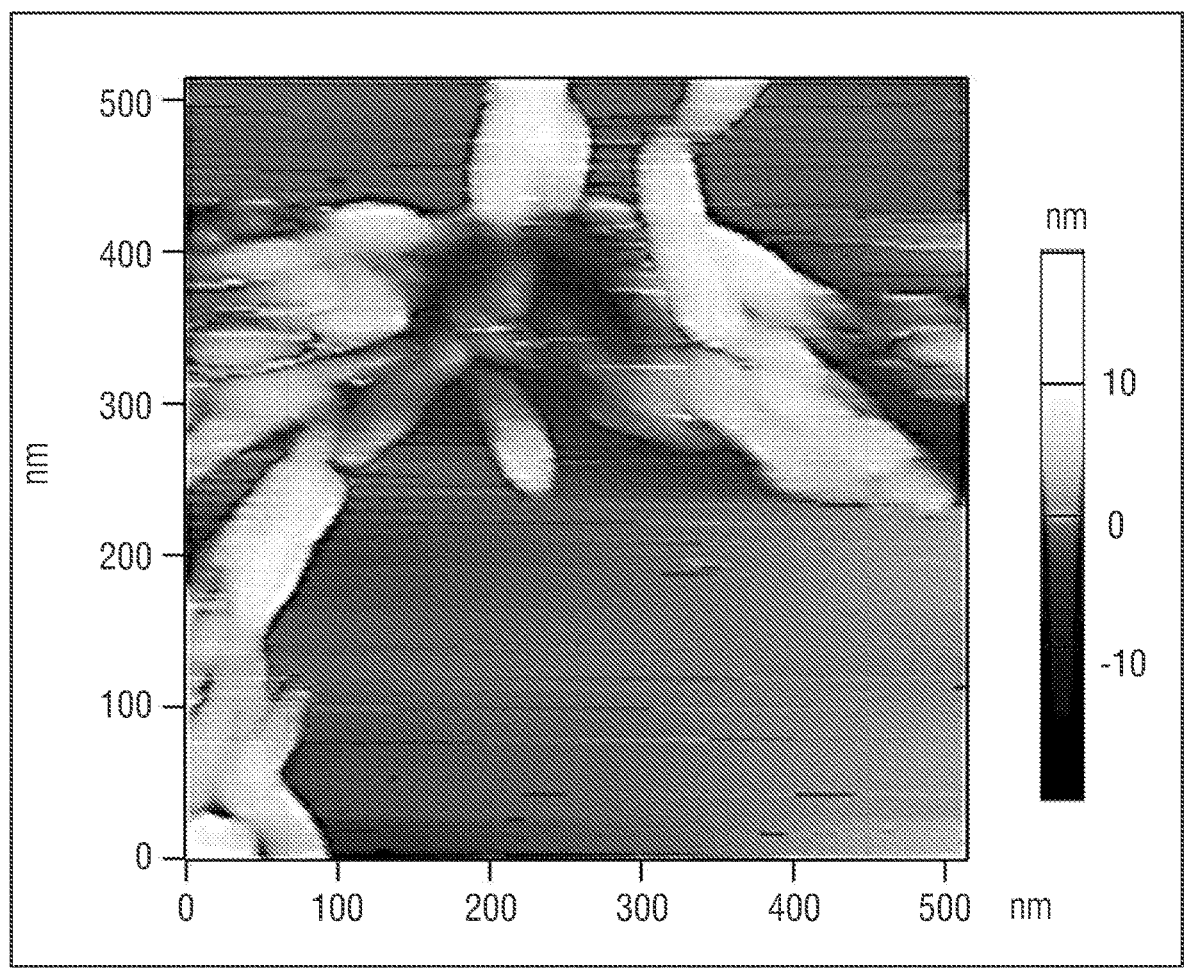
FIG. 1B shows an AFM image of carboxymethyl nanocellulose in formula VI with the scale 100 nm.

Into a 5 L 3-neck flask was added 5% Fe(DPA)(CTA) (60 g) and sodium bisulfate (75 g) in 2400 mL DI water. Under vigorous stirring, carboxymethyl cellulose (Avicel CL611, 300 g) was added to form a beige slurry. Then, 35% $H_2O_2$ (128 g) was added and stirred at room temperature for 3 h and then at 40-45° C. for 3 h. Then, 35% $H_2O_2$ (84 g) was added afterwards to stir at 40-50° C. overnight. The next day, 35% $H_2O_2$ (42 g) was added at 50-55° C. for 1 day. The resultant pale yellow slurry was filtered off and washed with DI water to 1080 g of 24% white hydrogel of carboxymethyl nanocellulose in formula VII. FIG. 1A shows an SEM image of carboxymethyl cellulose and FIG. 1B shows an AFM image of carboxymethyl nanocellulose with a rod shape of 80-100 nm in length and 8-10 nm in width.

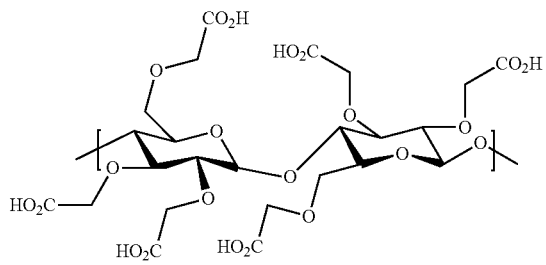

VII

Example 3

Preparation of Methyl Nanocellulose

Figure 2A:
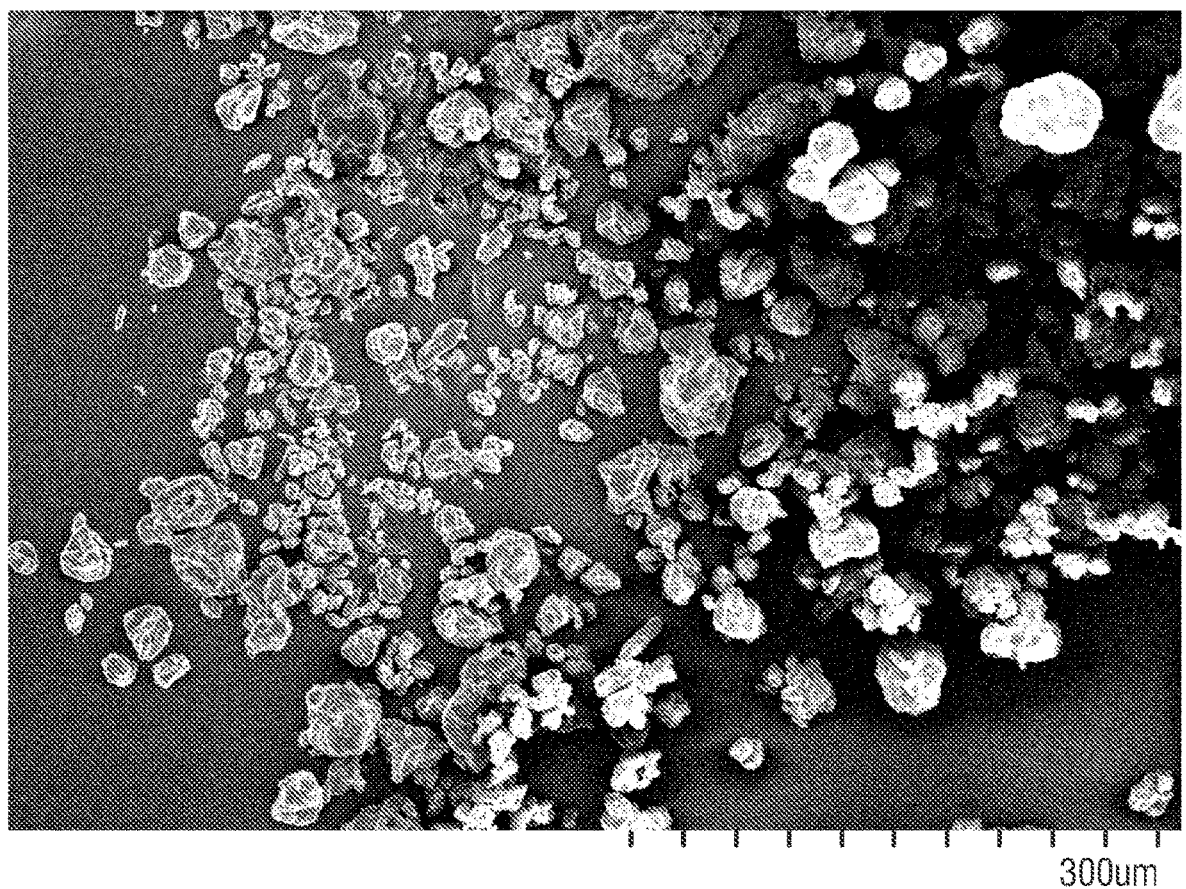
FIG. 2A shows an SEM image of methyl cellulose with the scale 300 μm.
Figure 2B:
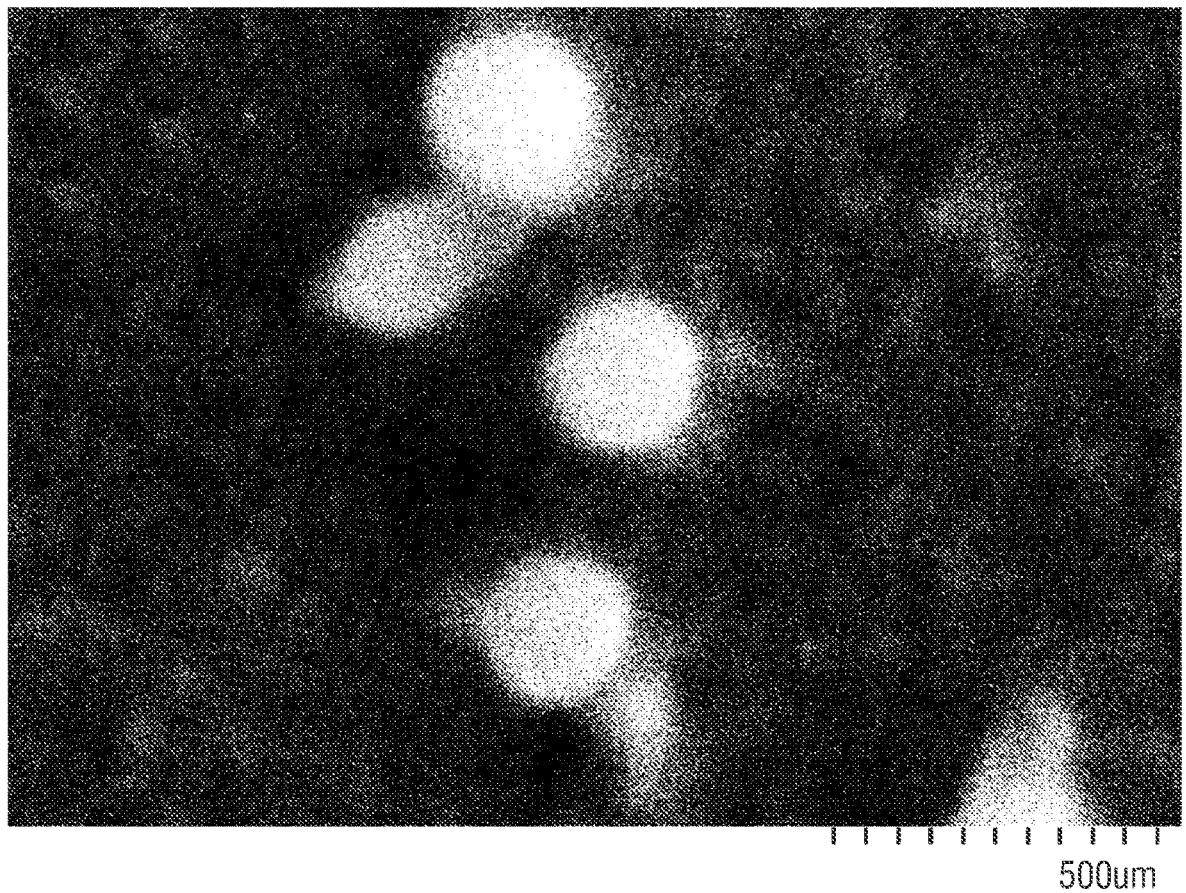
FIG. 2B shows an SEM image of methyl nanocellulose in formula VII with the scale 500 nm.

Methocel (20 g) was added into a mixture of 5% Fe(DPA) (CTA) (4 g) and anhydrous sodium bisulfate (2 g) in 200 mL water. Under vigorous stirring, 35% hydrogen peroxide (24 mL) was added. The sticky gel is slowly warmed to 40-50° C. and stirred 12 h. After a 12 mL peroxide addition, the solution was stirred for an additional 24 h. If the peroxide was still present, it was heated around 60° C. for 12 h to ensure reaction completion. The resultant pale yellow cloudy slurry was filtered off and washed with DI water 3×10 mL several times to yield 74 g of 5% semi-transparent solution of methyl nanocellulose in formula VI, as shown below. FIG. 2A shows an SEM image of the starting methyl cellulose and FIG. 2B shows an SEM image of the resulted methyl nanocellulose, showing the cleavage process is effective in the production of nanocellulose derivatives.

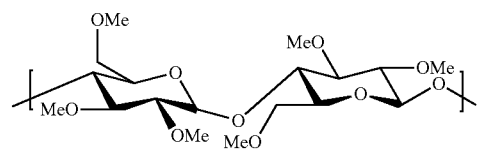

VI

Example 4

Preparation of a Modified Nanocellulose

Figure 3:
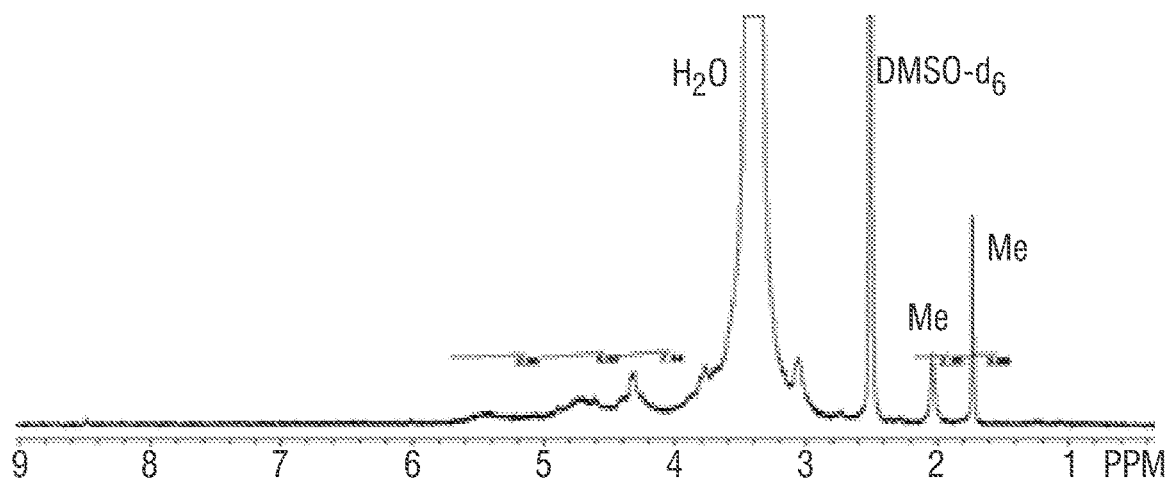
FIG. 3 shows $^1H$ NMR spectrum of modified nanocellulose, showing two methyl groups around 2 ppm.

An 18% oxidized nanocellulose (43 g) prepared from Example 13 is treated with acetic acid (50 mL) for 30 minutes, filtered off, and washed with acetic acid (10 mL) to yield white solids. After the solids were transferred into 200 mL flask, acetic anhydride (13 g), acetic acid (50 mL), and sulfuric acid (2-3 drops) were added. The mixture was stirred around 40° C. overnight to ensure reaction completion. Then, it was filtered off and washed with water thoroughly to yield white solids of modified nanocellulose in quantitative yield. FIG. 3 shows the $^1$H NMR spectrum of modified nanocellulose in DMSO-d6, showing two methyl groups around 2 ppm. It suggests the hydroxyl groups in oxidized nanocellulose are acetylated.

Example 5

Preparation of $Cu^{2+}$-Carboxymethyl Nanocellulose Complex

A mixture of $Cu(NO_3)_2(H_2O)_3$ (1.61 g) and 24% carboxymethyl nanocellulose (21 g) was stirred for 10 h, filtered off, and thoroughly washed to remove excess copper salt to yield pale blue copper-carboxymethyl nanocellulose complex in quantitative yield.

Example 6

Preparation of $Zn^{2+}$-Carboxymethyl Nanocellulose Complex

A mixture of $Zn(NO_3)_2(H_2O)_6$ (2.13 g) and 24% carboxymethyl nanocellulose (20 g) was stirred for 10 h, filtered off, and thoroughly washed to remove excess zinc salt to yield white $Zn^{2+}$-carboxymethyl nanocellulose complex in quantitative yield.

Example 7

Preparation of $Fe^{3+}$-Carboxymethyl Nanocellulose Complex

A mixture of $Fe(NO_3)_3(H_2O)_9$ (3.16 g) and 24% carboxymethyl nanocellulose (24 g) was stirred for 10 h, filtered off, and thoroughly washed to remove excess iron salt to yield pale orange $Fe^{3+}$-carboxymethyl nanocellulose complex in quantitative yield.

Example 8

Complexation of Carboxy Methyl Nanocellulose and Cerium Oxide

Figure 4:
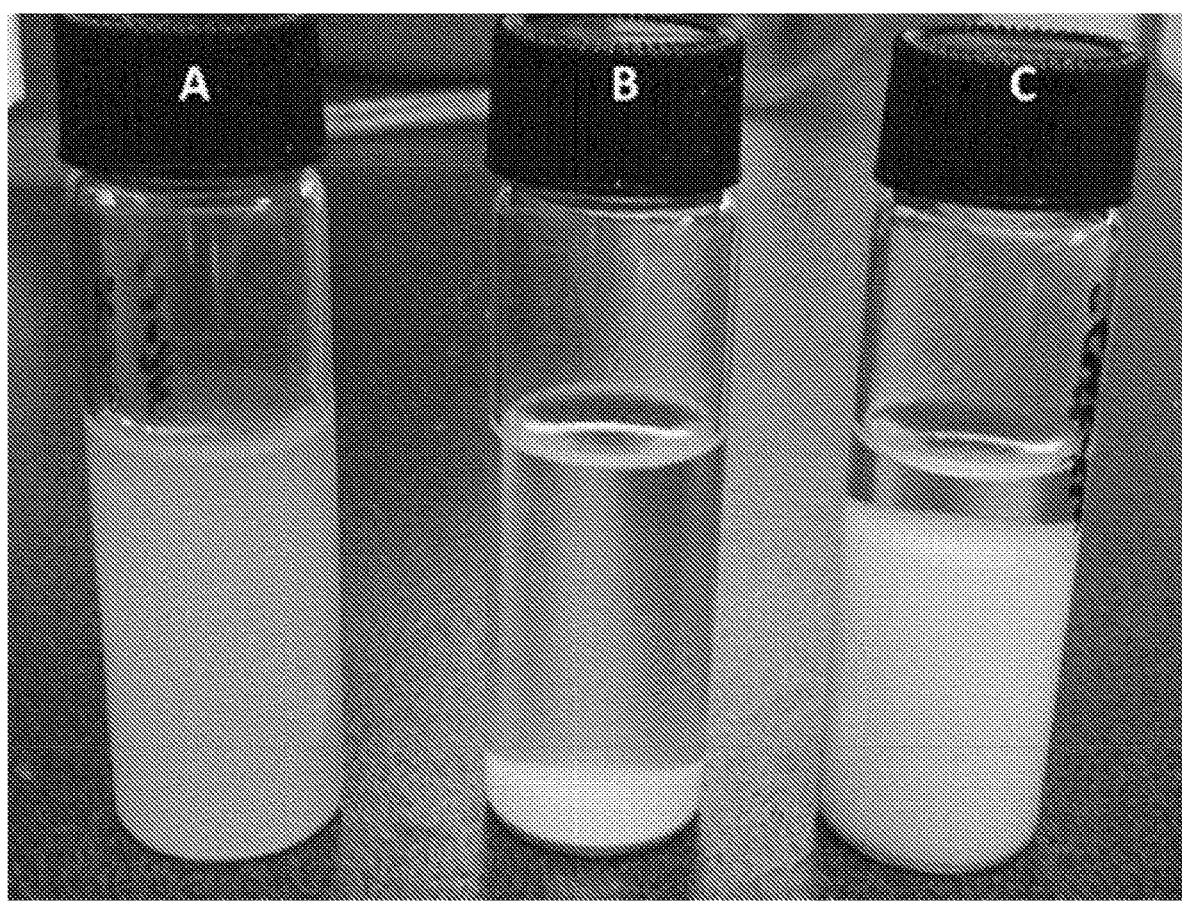
FIG. 4 shows optical images for (A) 0.25% carboxymethyl nanocellulose, (B) 0.25% cerium oxide and (C) 0.25% carboxymethyl nanocellulose and 0.25% cerium oxide after 2 hours mixing.

In 20 mL vials, 0.25% cerium oxide, 0.25% carboxy methyl nanocellulose, a mixture of 0.25% cerium oxide and 0.25% carboxy methyl nanocellulose in 10 mL were prepared, respectively. After vigorously mixing, their colloidal stability was observed. FIG. 4 shows optical images for (A) 0.25% carboxy methyl nanocellulose, (B) 0.25% cerium oxide, and (C) 0.25% carboxy methyl nanocellulose and 0.25% cerium oxide after 2 hours mixing. This result indicates the enhanced colloidal stability of the mixture of cerium oxide and carboxy methyl nanocellulose and the complex formation between cerium oxide and nanocellulose.

Example 9

Mixing of a Modified Nanocellulose with Oil.

A modified nanocellulose prepared from Example 4 in 5 mL water was mixed with vacuum oil vigorously for 1-2 minutes and observed uniform mixing between nanocellulose and oil. Table 1 presents a mixture of nanocellulose and oil in different concentrations, indicating that with increasing the concentration of nanocellulose, its mixing with oil is more effective.

TABLE 1

| Experiment number | Nanocellulose | oil |
|---|---|---|
| 1 | 2% | 0.2 g |
| 2 | 4% | 0.2 g |
| 3 | 4% | 0.5 g |

Example 10

De-Colorization of Food Dye Using $Fe^{3+}$-Carboxy Methyl Nanocellulose Complex.

A mixture of $Fe^{3+}$-carboxy methyl nanocellulose complex and Yellow food dye, $H_2O_2$ in 5 mL DI water was prepared in 20 mL vial, showing oxidative de-colorization. Without the iron catalyst, there is no de-colorizations. Table 2 shows time for de-colorization, which was visually measured. The rate of de-colorization increases with increasing the concentration of the $Fe^{3+}$-carboxy methyl nanocellulose complex catalyst. It is found that hydrogen peroxide is fairly stable over several days without decomposition.

TABLE 2

| Experiment number | Fe3 + (nanocellulose-) complex | Yellow food dye | $H_2O_2$ | Time for decolorization |
|---|---|---|---|---|
| 1 | 0.3% | 0.1% | 0.5% | 1 day |
| 2 | 0.3% | 0.5% | 0.5% | 2 days |
| 3 | 1.0% | 0.1% | 0.5% | 3 hours |
| 4 | 1.0% | 0.5% | 0.5% | 5 hours |

Example 11

Preparation of Carboxylic Acid (or Oxidized) Cellulose from Bleached Hardwood Pulp.

Figure 5A:
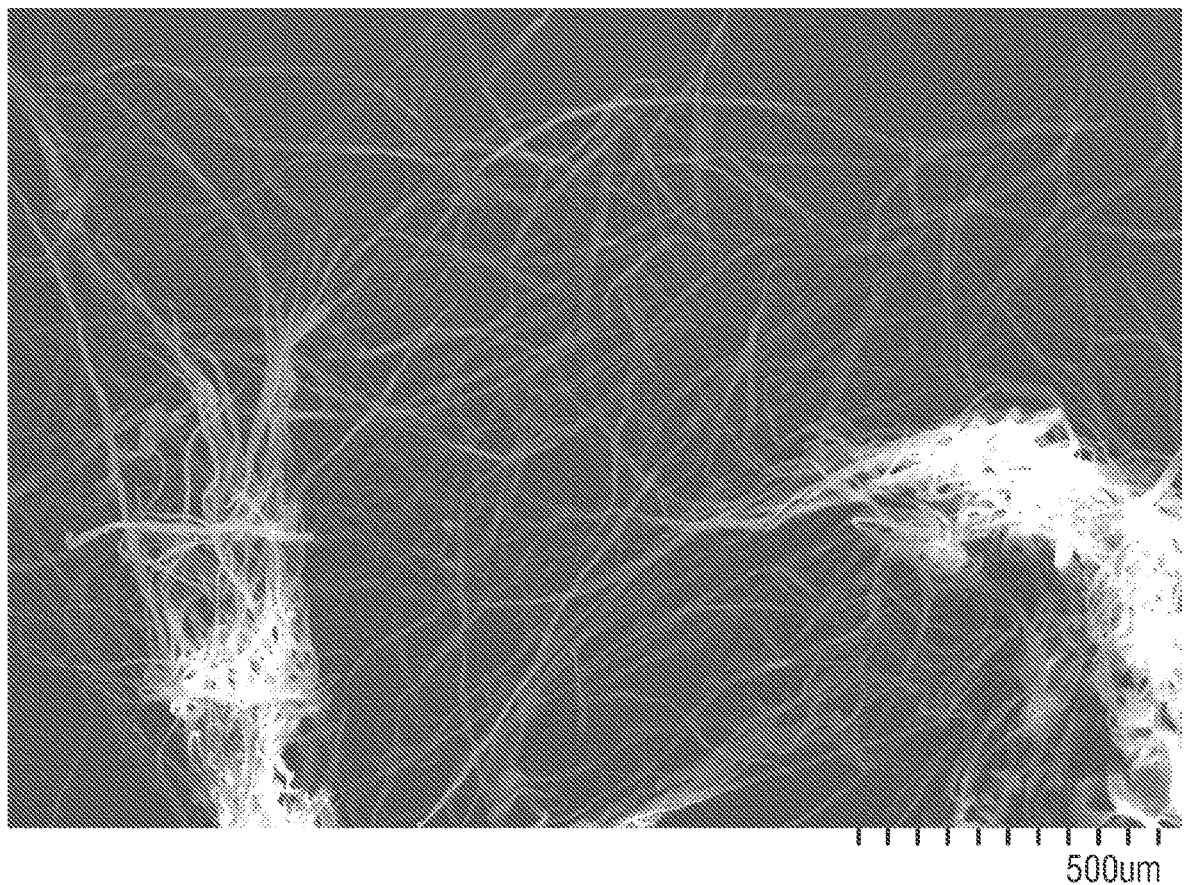
FIG. 5A displays an SEM image of bleached hardwood pulp before the cellulose oxidation in scale 500 μm.
Figure 5B:
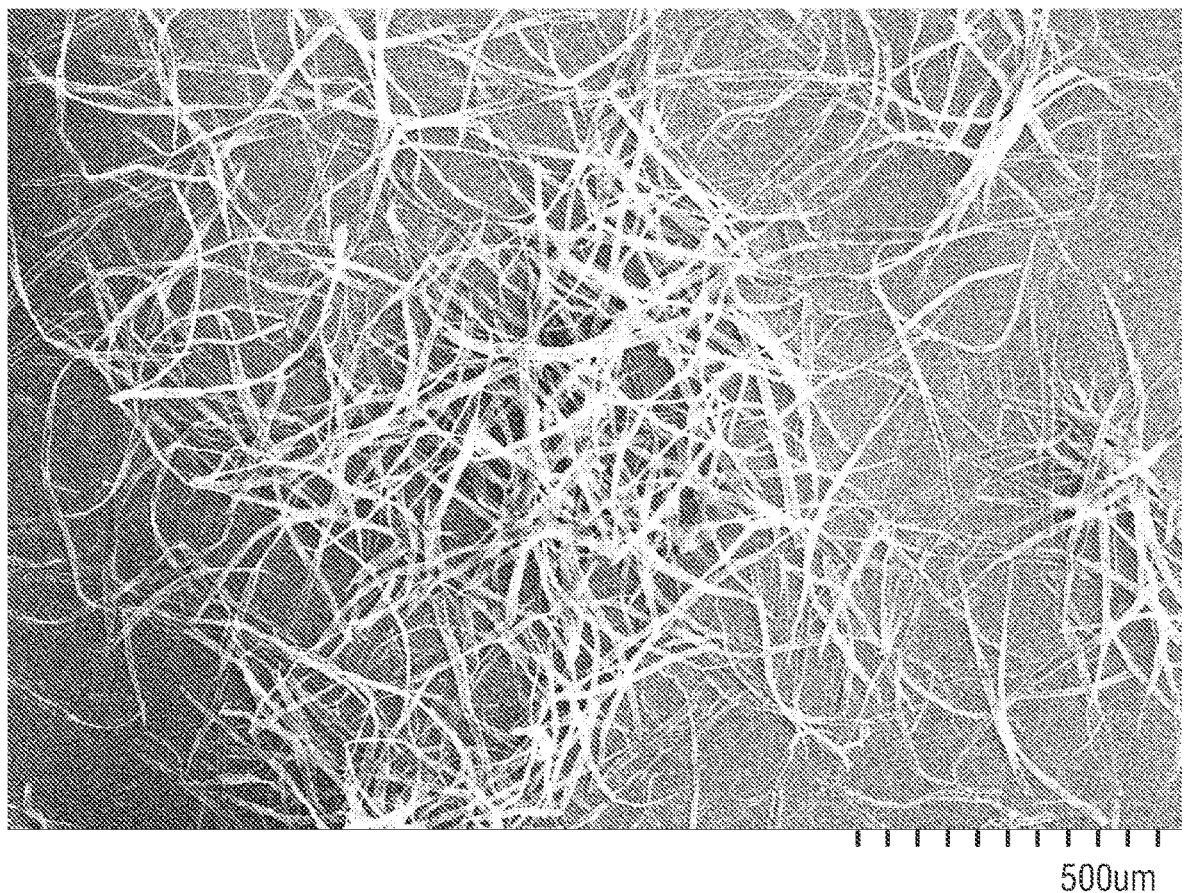
FIG. 5B and FIG. 5C display SEM images of bleached hardwood pulp after the cellulose oxidation in scale 500 μm and 30 μm, respectively.
Figure 5C:
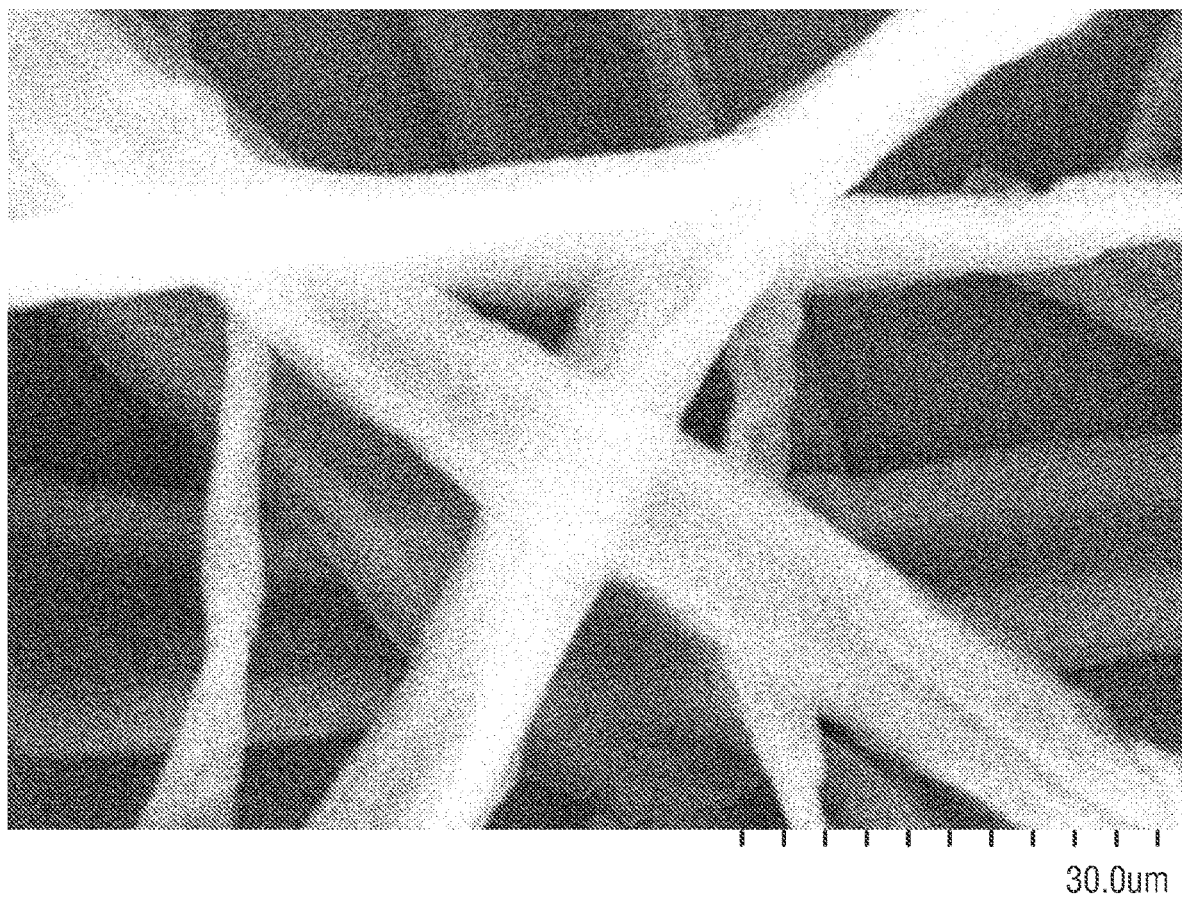
Figure 5D:
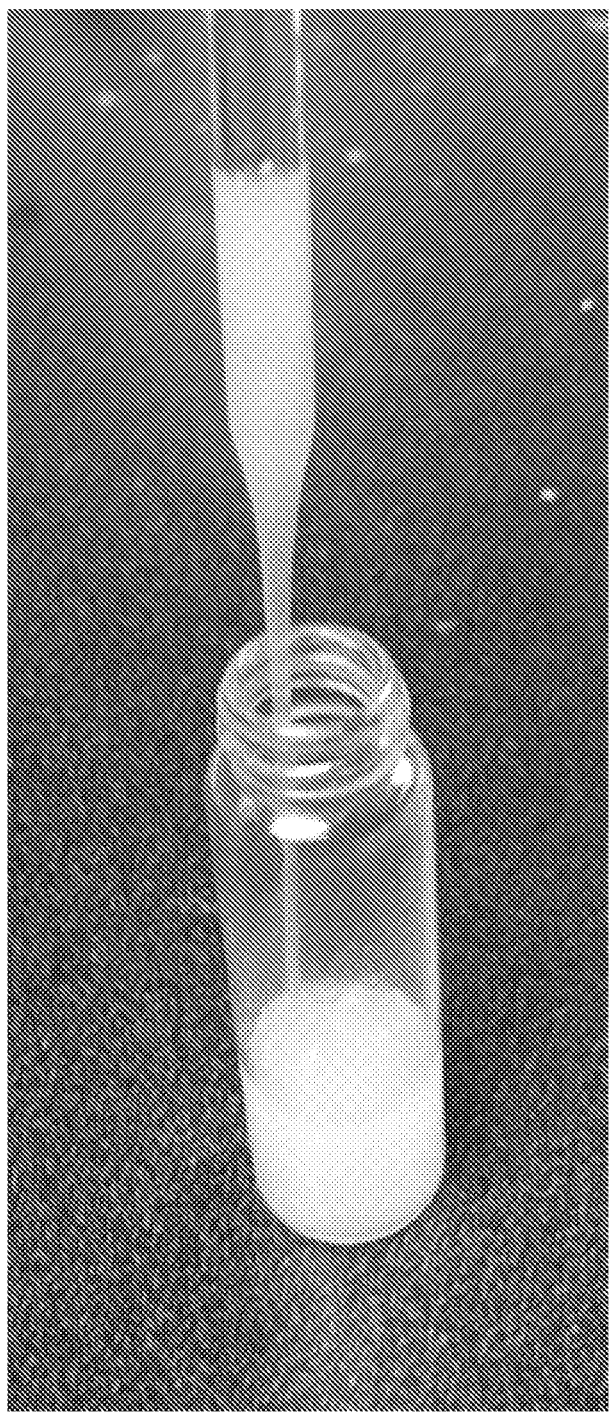
FIG. 5D shows an image of pipetted oxidized cellulose indicating the oxidation was almost completed.
Figure 6A:
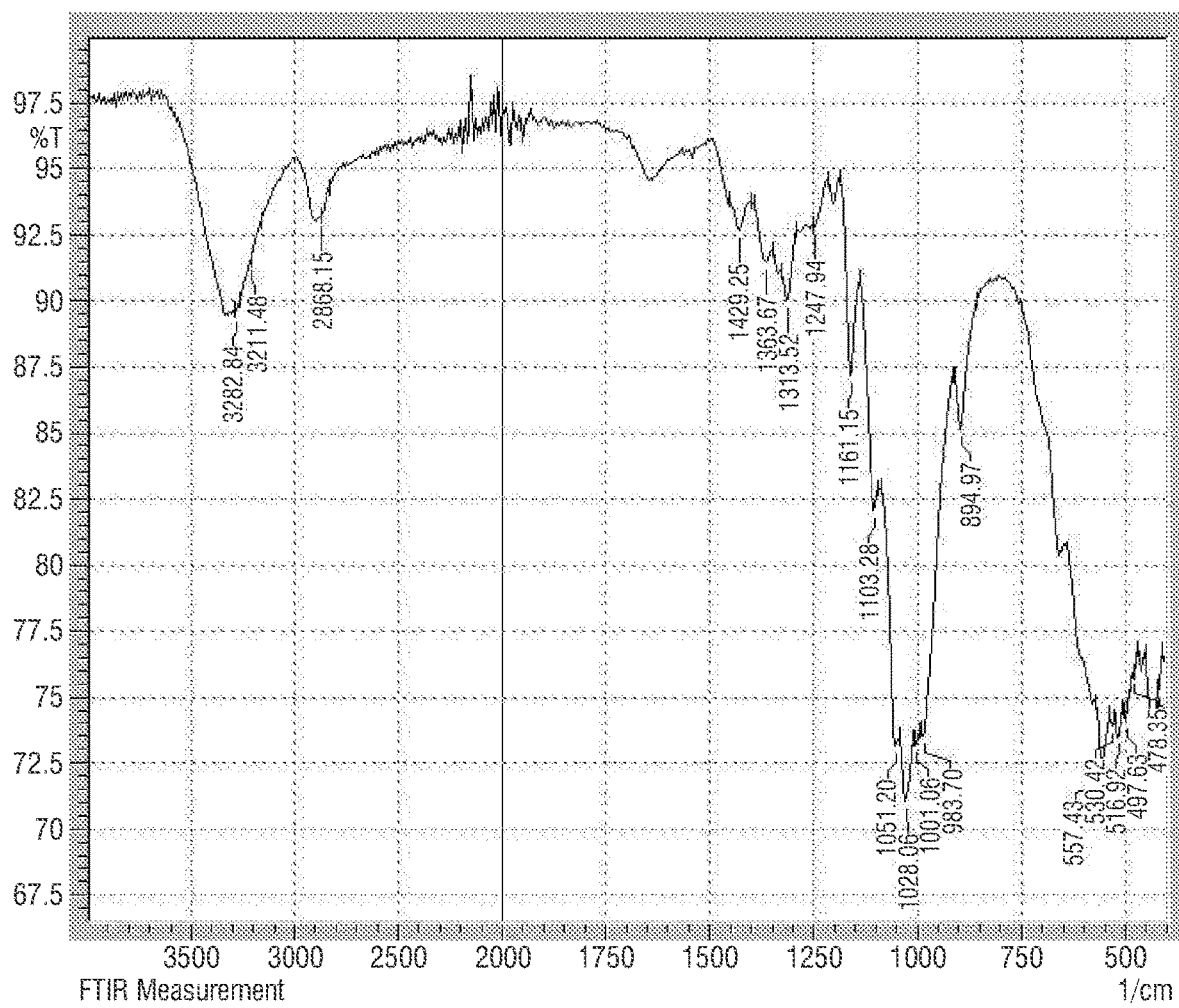
FIG. 6A and FIG. 6B show the IR spectra before and after cellulose oxidation showing a new peak 1750 $cm^{-1}$ after the oxidation.
Figure 6B:
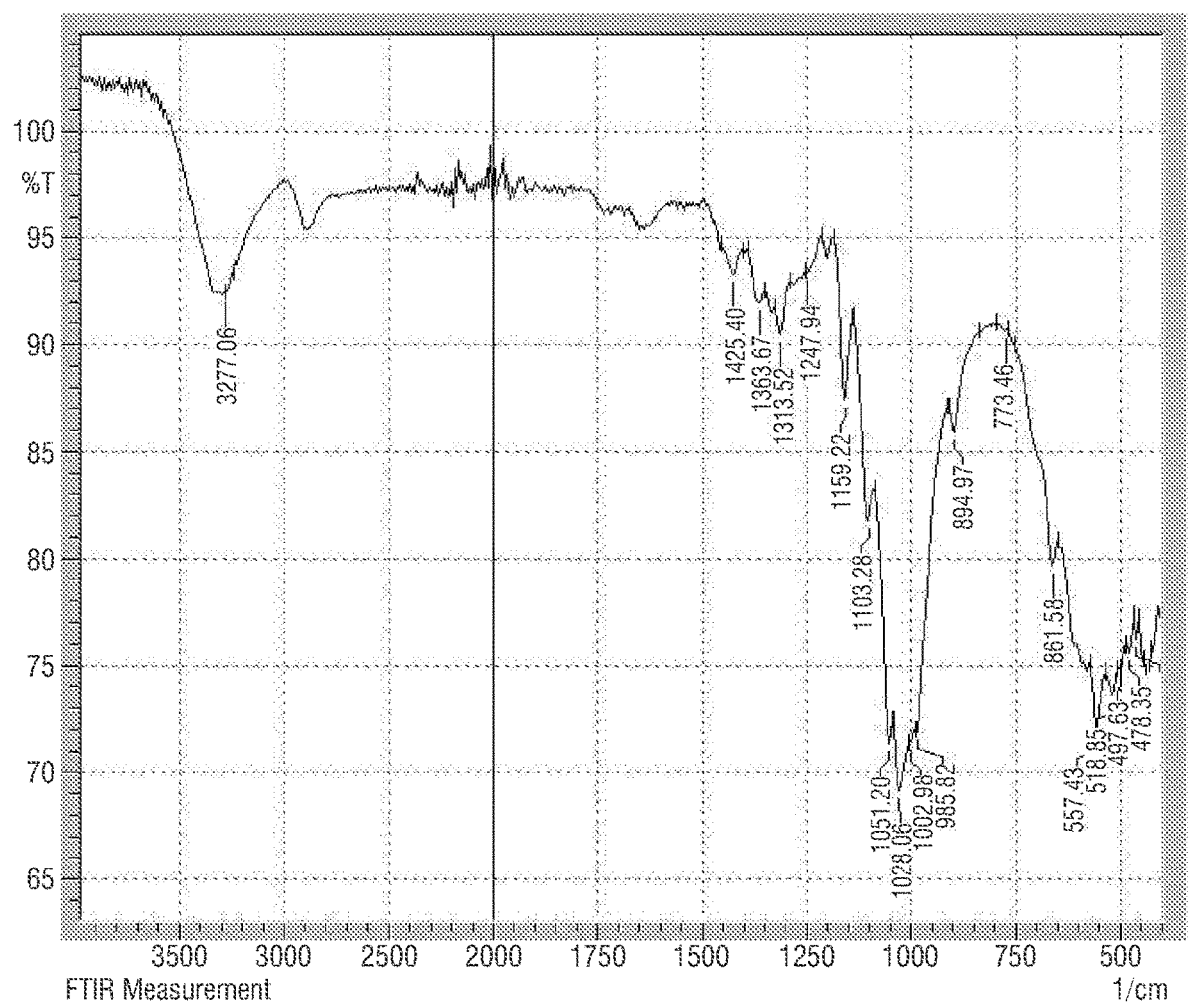

A 5 L flask was placed and equipped with mechanical stirrer and heating mantle. It was charged with citric acid (CTA, 50) g, sodium bisulfate (SBS, 2.5 g), aq. 5% Fe(DPA)(CTA) (50 g), and 2 L water. Bleached wood pulp (110 g) was then cut into pieces small enough to add into the flask. Under stirring, 35% $H_2O_2$ (72 g) was added and the reaction mixture was heated at 40° C. for around 6 h. The bleached pulp was dispersed and oxidized as the reaction proceeded. In the next 3 days, more g of 35% $H_2O_2$ was added when needed while the reaction temperature was maintained at 60-65° C. After the reaction was completed, the pale yellow slurry was filtered off to yield white oxidized cellulose and washed with deionized (DI) water to remove reaction residues. Yield: 629 g of 11.6% solid content white hydrogel in formula VII. FIG. 5A displays an SEM image of bleached hardwood pulp before the cellulose oxidation. FIG. 5B and FIG. 5C display SEM images of bleached hardwood pulp after the cellulose oxidation. Based on the images, commercial bleached wood pulp before the oxidation process clearly shows clogging of cellulose fibers. After the oxidation, it forms uniform fibrils without changing the size. FIG. 5D shows an image of pipetted oxidized cellulose indicating the oxidation was almost completed. FIG. 6A and FIG. 6B shows the IR spectra before and after cellulose oxidation, showing a new peak 1750 cm$^{-1}$ after the oxidation.

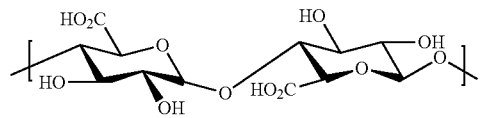

VII

Example 12

Preparation of Carboxylic Acid (or Oxidized) Microcrystalline Cellulose (MCC).

A 1 L flask was placed on heating mantle and equipped with mechanical stirrer, thermometer and condenser. Into the flask was charged DI water (300 mL), CTA (12 g), SBS (0.6 g), and 5% Fe(DPA)(CTA) (12 mL), and commercial MCC (Avicel PH101, 50 g). While stirring, 35% $H_2O_2$ (11.43 g) was added and the white slurry was heated for 50-55° C. for 4 h. Around 2×22.86 g of 35% $H_2O_2$ was added over a period of 2 days. The reaction product was filtered off and washed with DI water several times to yield 160.3 g of 23.4%-dry weight white oxidized MCC hydrogel.

Example 13

Preparation of Carboxylic Acid (or Oxidized) Nanocellulose from Oxidized Cellulose Derived from Bleached Wood Pulp.

Figure 7A:
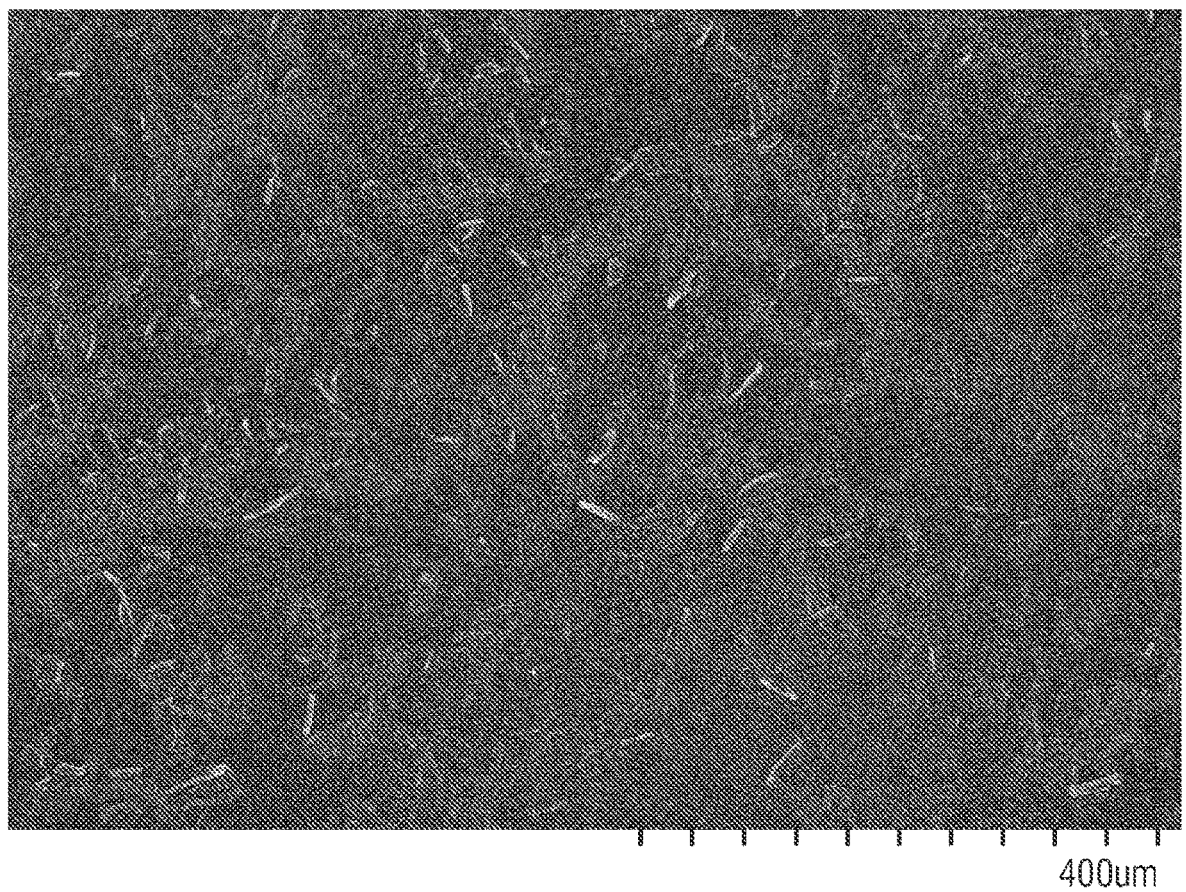
FIG. 7A shows an SEM image of carboxylic acid-containing nanocecellulose after cellulose cleavage of carboxylic acid-containing cellulose prepared from bleached hardwood pulp in scale 400 μm.
Figure 7B:
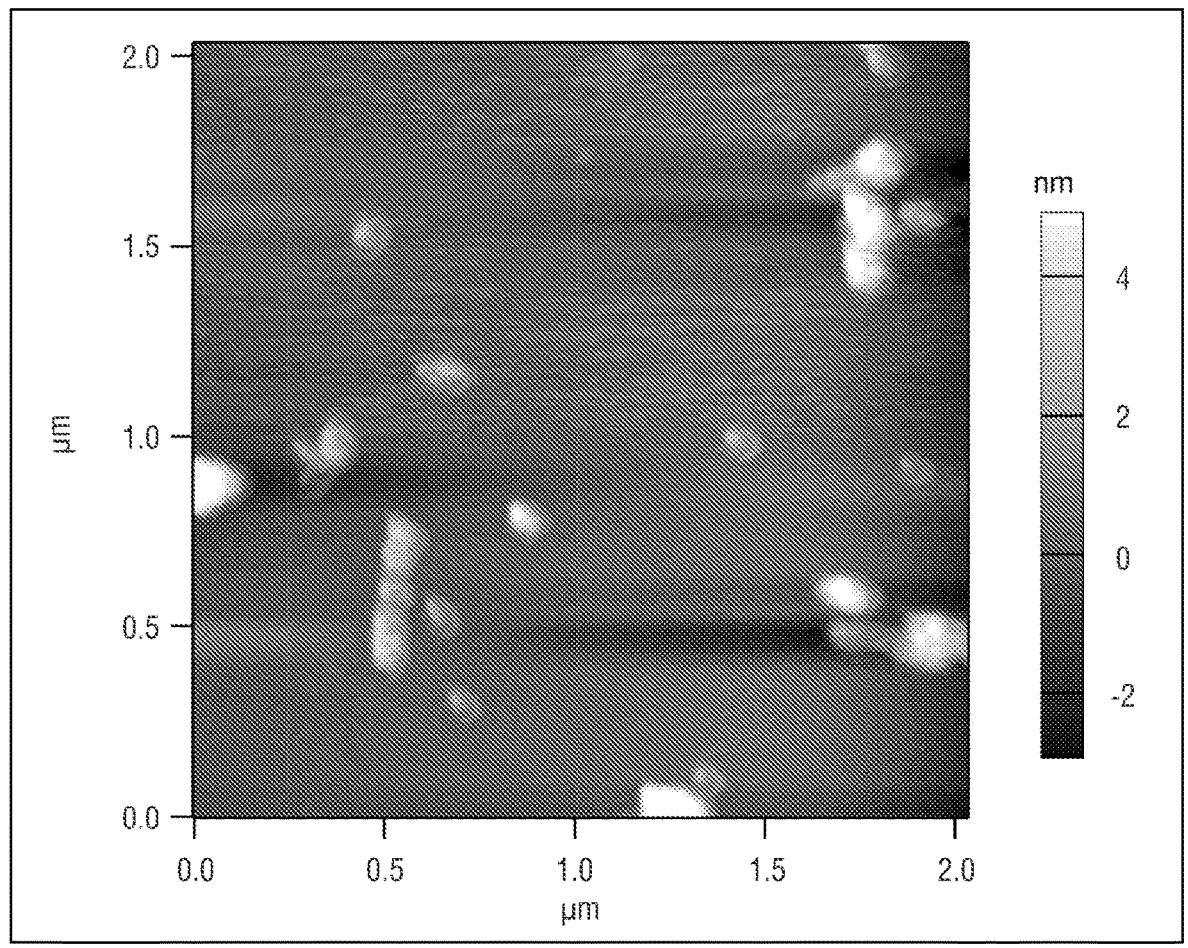
FIG. 7B shows an AFM image in 1 μm scale of carboxylic acid-containing nanocecellulose after cellulose cleavage of carboxylic acid-containing cellulose prepared from bleached hardwood pulp.
Figure 7C:
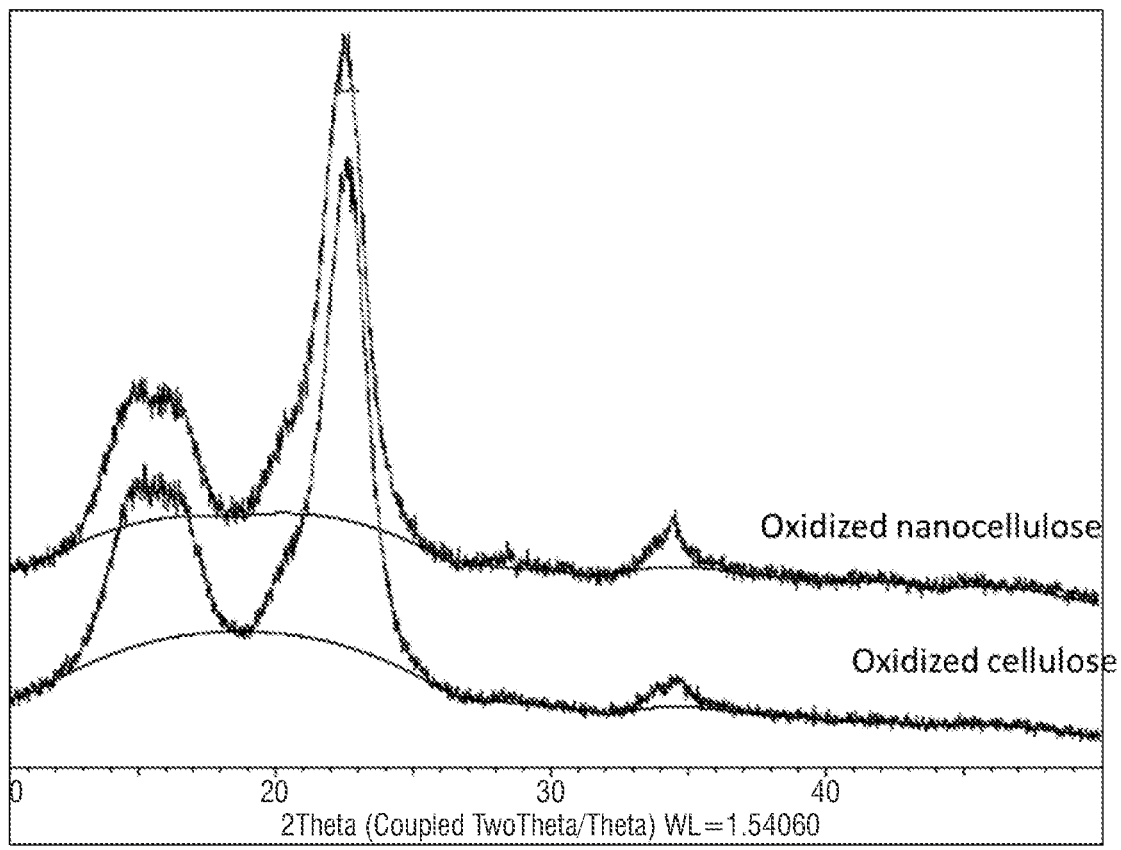
FIG. 7C shows XRD data of oxidized cellulose and oxidized nanocellulose showing 87.9% crystallinity for OC and 90.1% for ONC based on the Ruland-Vonk's method.
Figure 7D:
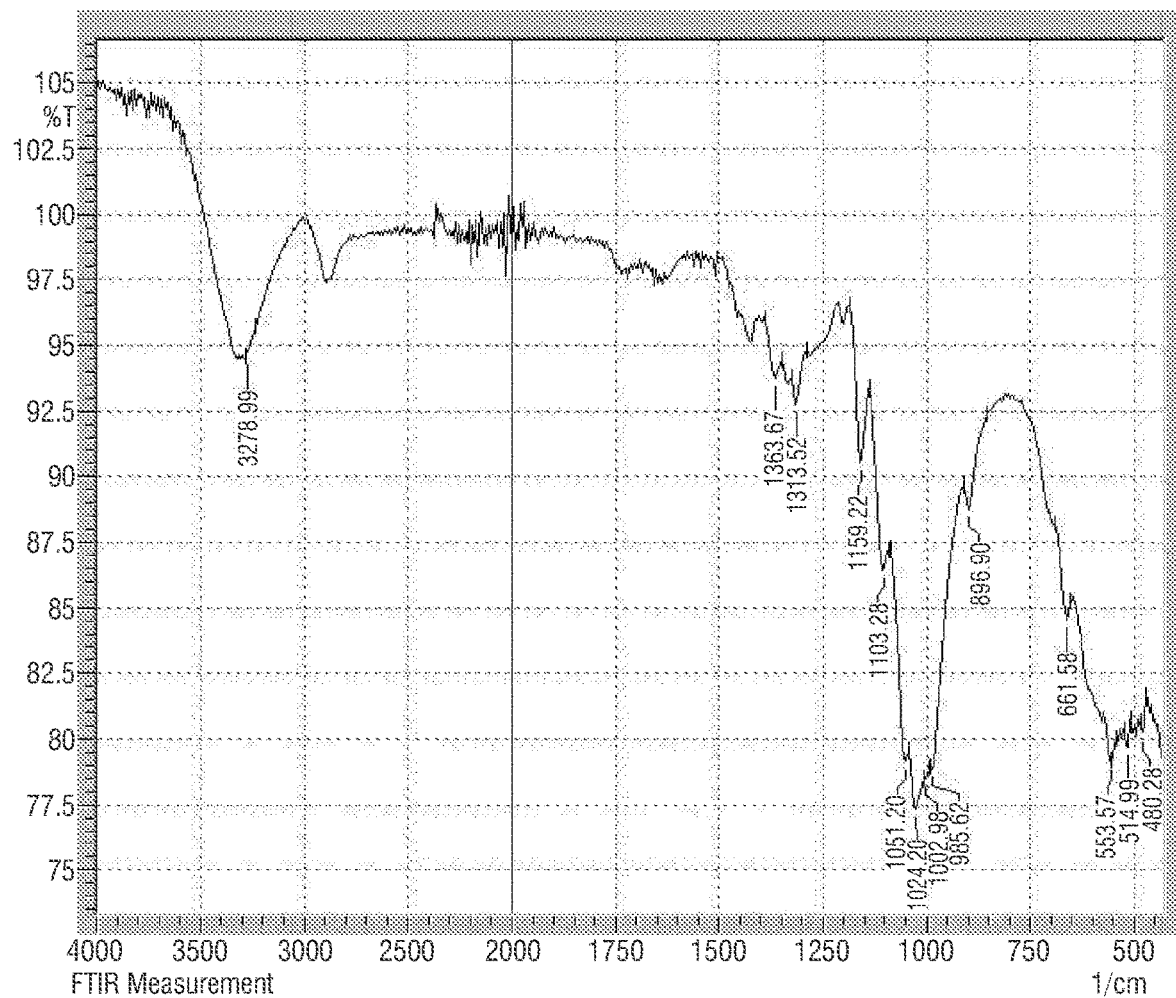
FIG. 7D shows the IR spectra of the resulted nanocellulose after cellulose cleavage showing a similar spectrum to that of oxidized cellulose.

Into a 3-neck 2 L flask was added oxidized cellulose (from bleached hardwood pulp, 626.6 g) from Example 11, sodium bisulfate (10 g), 5% Fe(DPA)(CTA) (20 g), and 35% $H_2O_2$ (57 g) in 850 mL DI water and the slurry was stirred around 55° C. As hydrogen peroxide depletes, more hydrogen peroxide is added. Around 75 g of 35% hydrogen peroxide was added in several portions over a period of 3 days. The reaction product was filtered off and washed with DI water to yield 342 g of 13.6% dry weight white hydrogel of oxidized nanocellulose. FIG. 7A shows an SEM image in 400 μm scale and FIG. 7B shows an AFM image in 500 nm scale of oxidized nanocellulose. Compared to the image for the microfibrils of oxidized cellulose, the image for the resulted nanocellulose demonstrates the significantly reduced particle size into nanometer range. FIG. 7C shows the XRD data of oxidized cellulose and nanocellulose observing enhanced crystallinity after cellulose cleavage. FIG. 7D shows the IR spectra of the resulted nanocellulose after cellulose cleavage showing a similar spectrum to that of oxidized cellulose.

Example 14

Preparation of Carboxyl Acid (Oxidized) Nanocellulose Derived from Oxidized MCC.

Figure 8A:
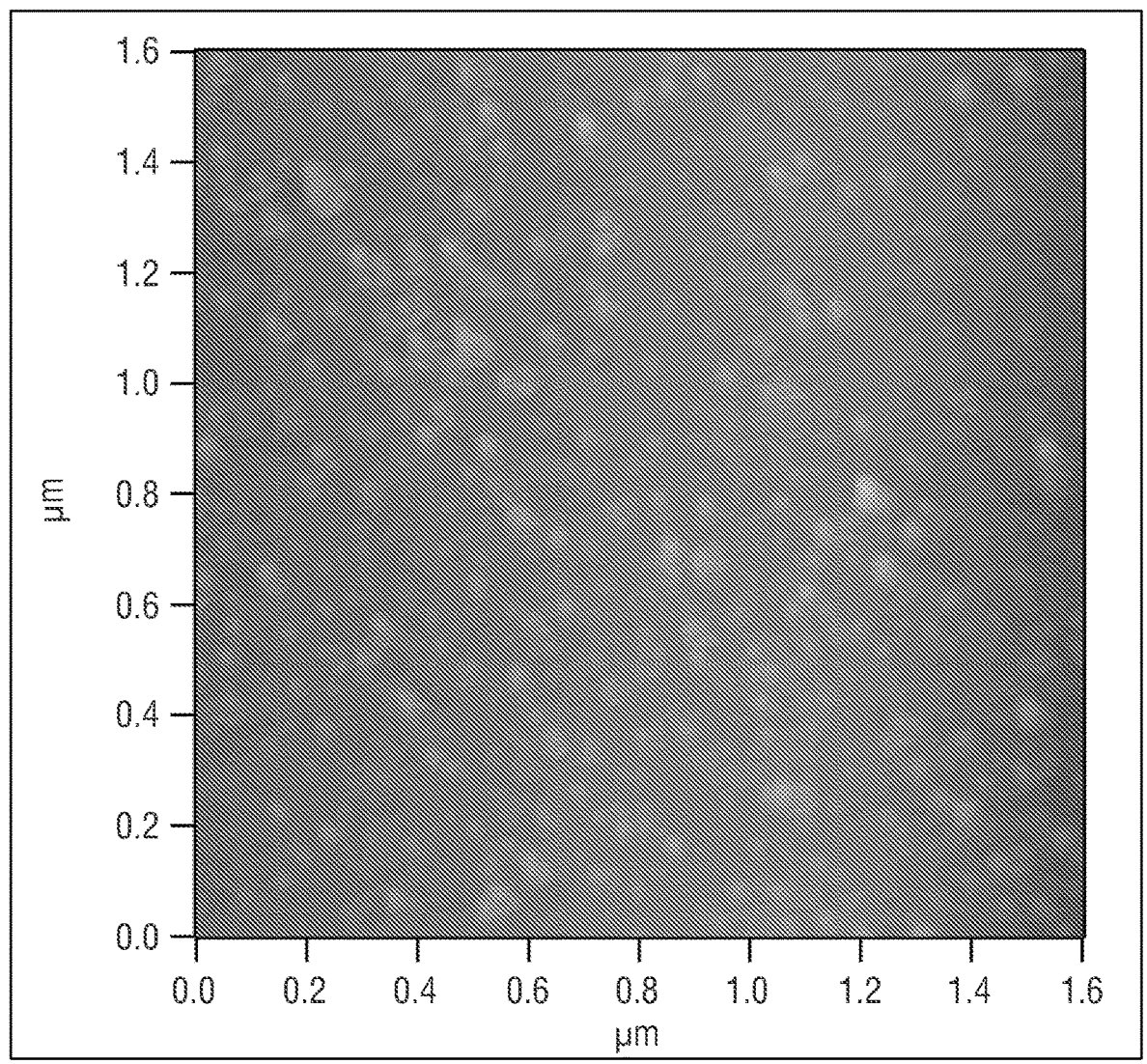
FIG. 8A shows an SEM image in scale 200 nm of carboxylic acid-containing nanocellulose after cellulose cleavage of carboxylic acid-containing cellulose prepared from commercial microcrystalline cellulose (CMC).
Figure 8B:
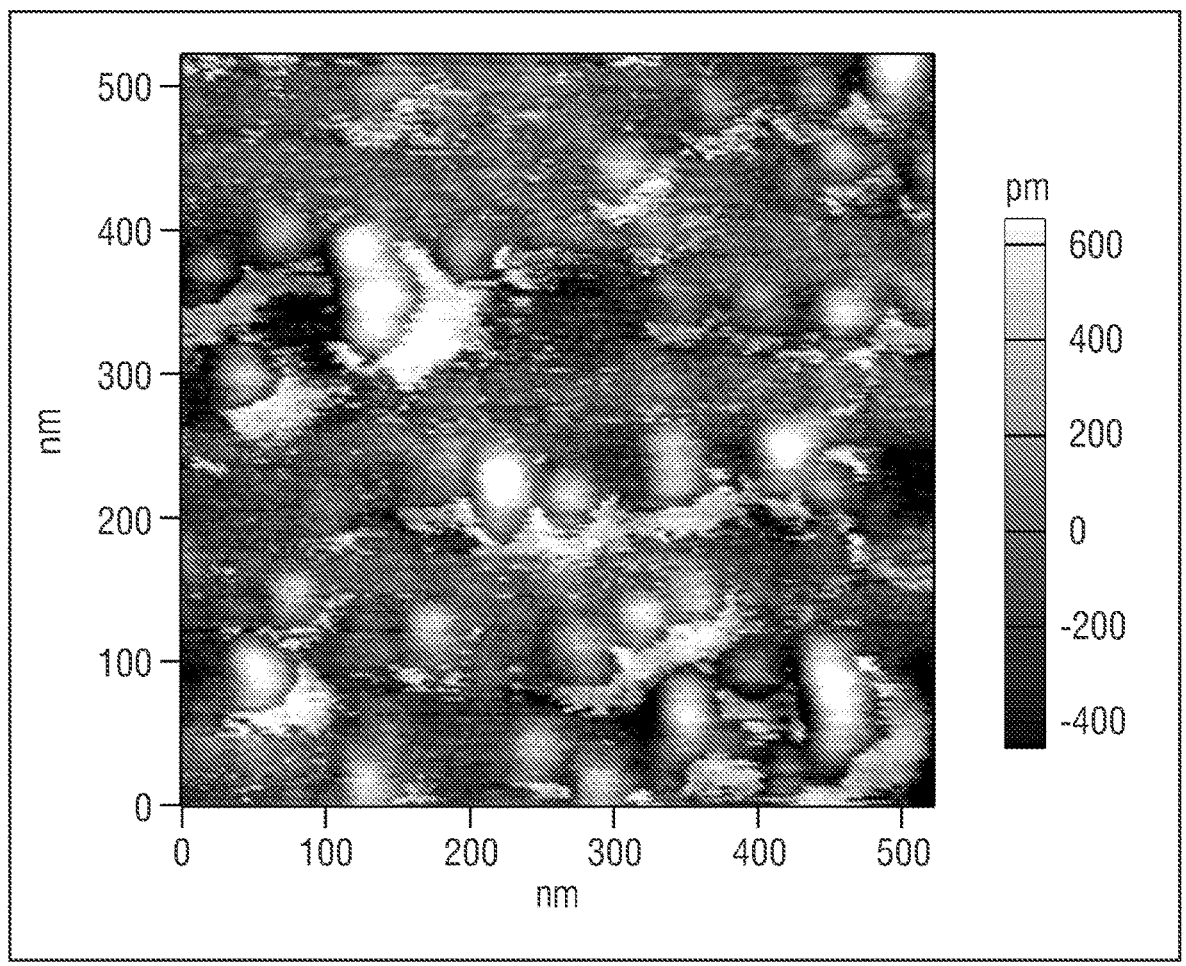
FIG. 8B shows an AFM image in 100 nm scale of carboxylic acid-containing nanocellulose after cellulose cleavage of carboxylic acid-containing cellulose prepared from commercial microcrystalline cellulose (CMC).

A 1 L three flask was placed in heating mantle and equipped with thermometer, stirrer, and condenser. Then, a mixture of oxidized MCC (85.8 g) from Example 12, aq. 5% Fe(DPA)(CTA) (8 g), SBS (4 g), aq. 35% $H_2O_2$ (22.86) was added and heated and stirred at 50° C. for 2 days. Around 28.5 (2×11.4 g and 5.7 g) g of 35% hydrogen peroxide was added in portions to complete the reaction over 2 days. After the reaction completion, the reaction product was filtered off and washed with water to yield 99.2 g of 13.6% dry weight white hydrogel of carboxyl acid (oxidized) nanocellulose. FIG. 8A shows an SEM image of the resulted oxidized nanocellulose cellulose in 200 nm scale and FIG. 8B shows an AFM image of the resulted oxidized nanocellulose cellulose in 100 nm scale of the resulted oxidized nanocellulose.

Example 15

Preparation of Ethyl Carboxylic Acid Ester Nanocellulose

Figure 9:
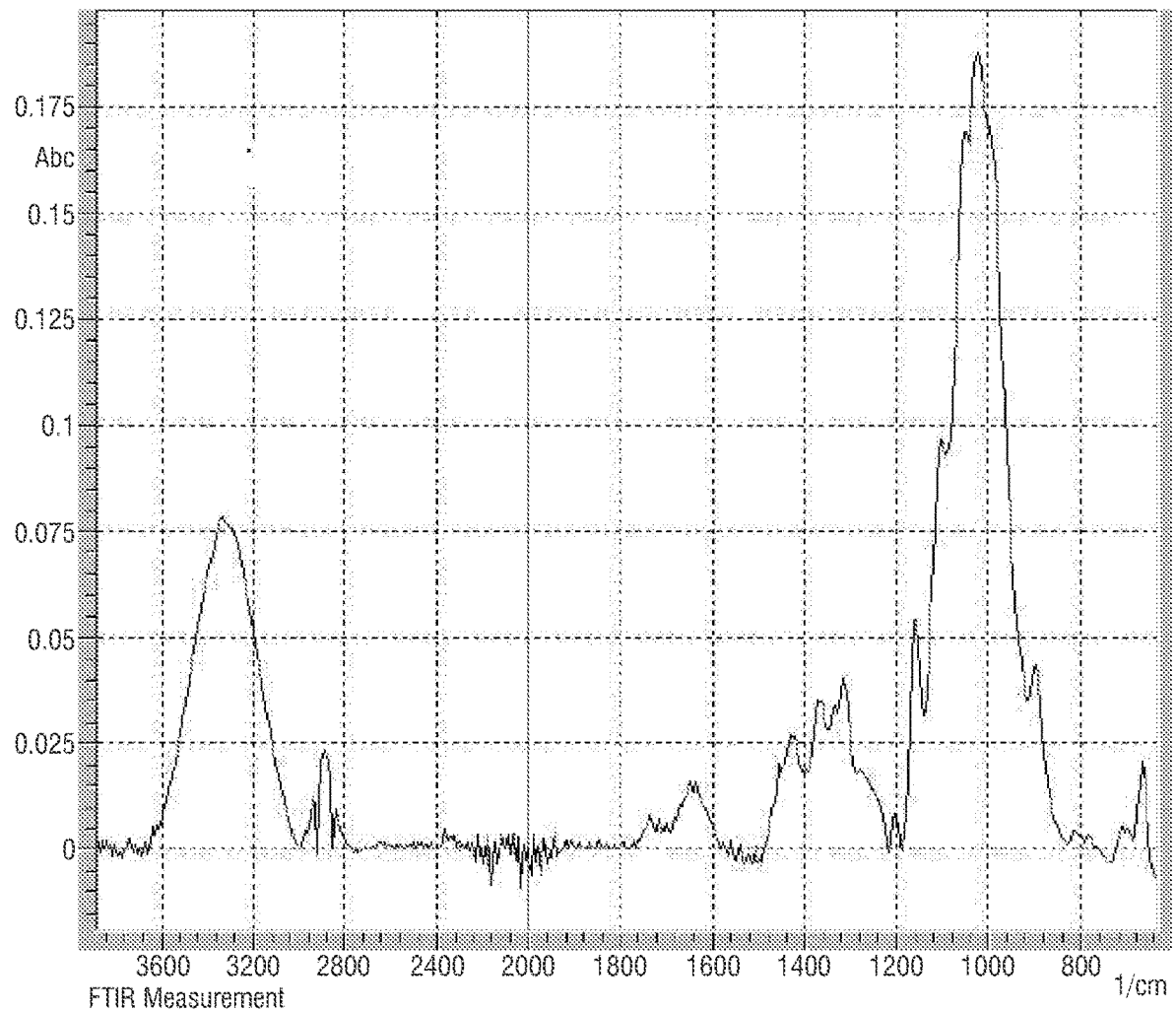
FIG. 9 shows the solid IR spectra of the ethyl carboxylic acid nanocellulose.

Oxidized nanocellulose from Example 15 (159 g) was put into 1 L flask and treated with denatured ethanol (500 mL). After stirring for 1 h, the white slurry was filtered off and washed with ethanol. The filtered solid was put back into the flask and ethanol (500 mL) was charged. After addition of 5 drops of concentrated $H_2SO_4$, the slurry was stirred at 40-45° C. overnight. Next day, it was filtered off and washed with ethanol to yield 114.2 g of 11.2% dry weight white gel of ethyl carboxylic acid ester nanocellulose. FIG. 9 depicts the IR spectrum of the ethyl carboxylic acid ester nanocellulose.

Example 16

Reaction of Ethyl Carboxylic Acid Ester Nanocellulose with Ammonia.

Figure 10:
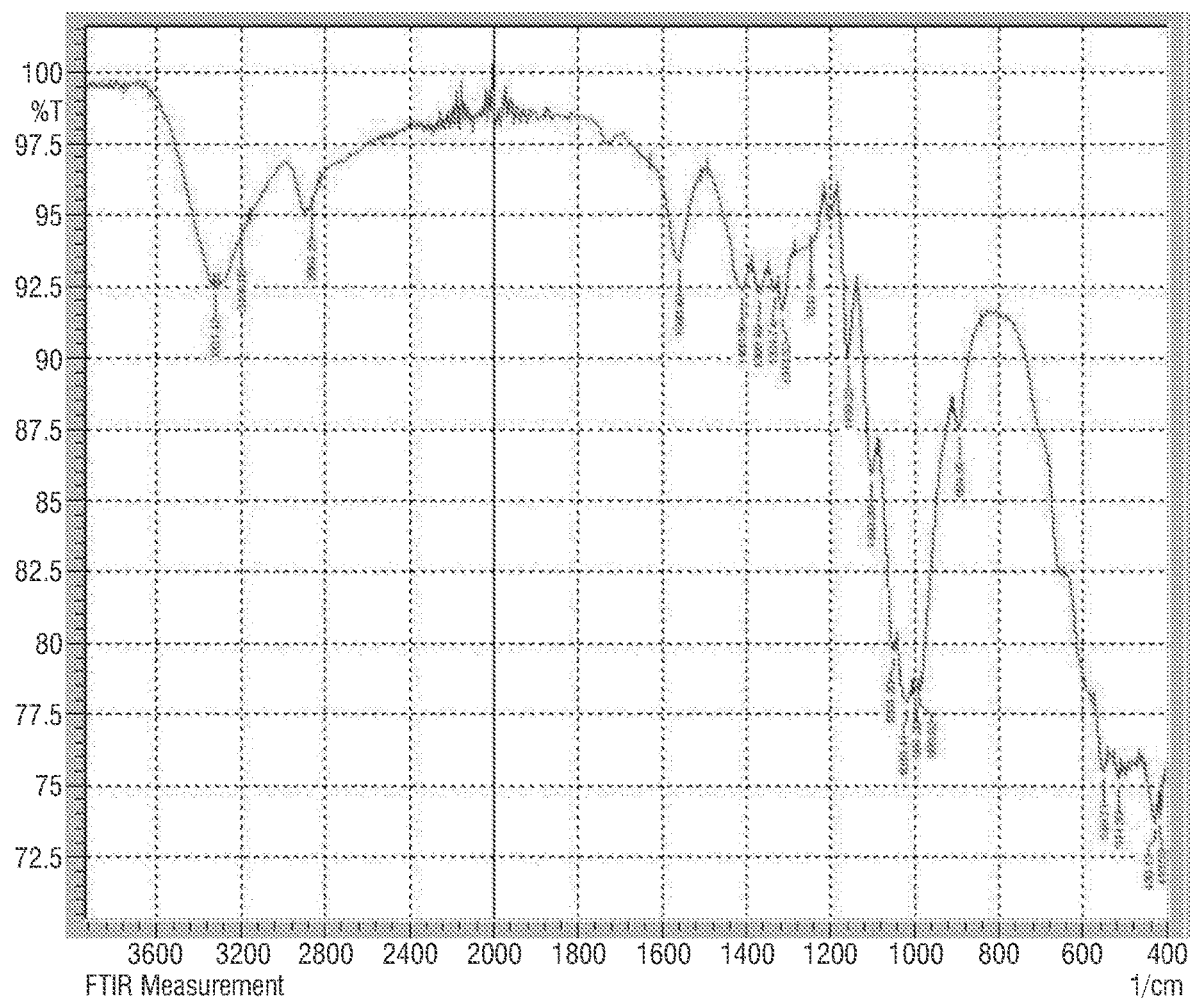
FIG. 10 shows the solid IR spectra of nanocellulose derived from amine.

A mixture of carboxyl acid (oxidized) nanocellulose (30 g) and excess 29% ammonium hydroxide (4.5 g) was heated around 40-50° C. overnight and the resulting pale yellow slurry was filtered off and washed with DI water to yield 38.4 g of 5.38% pale yellow hydrogel of amino nanocellulose. FIG. 10 shows the IR spectrum of the air dried nanocellulose derived from ammonium showing significant changes in CO stretching frequency from 1650 $cm^{-1}$ to 1570 $cm^{-1}$ as well as NH peaks. Similarly, the reaction of 9.4% solid ethyl carboxylic acid ester nanocellulose (64 g) and ethylene diamine (2.285 g) produces 55.8 g of the corresponding nanocellulose hydrogel in 7.4% dry weight.

Example 17

Reaction of Ethyl Carboxylic Acid Ester Nanocellulose and Amino Acids.

Figure 11:
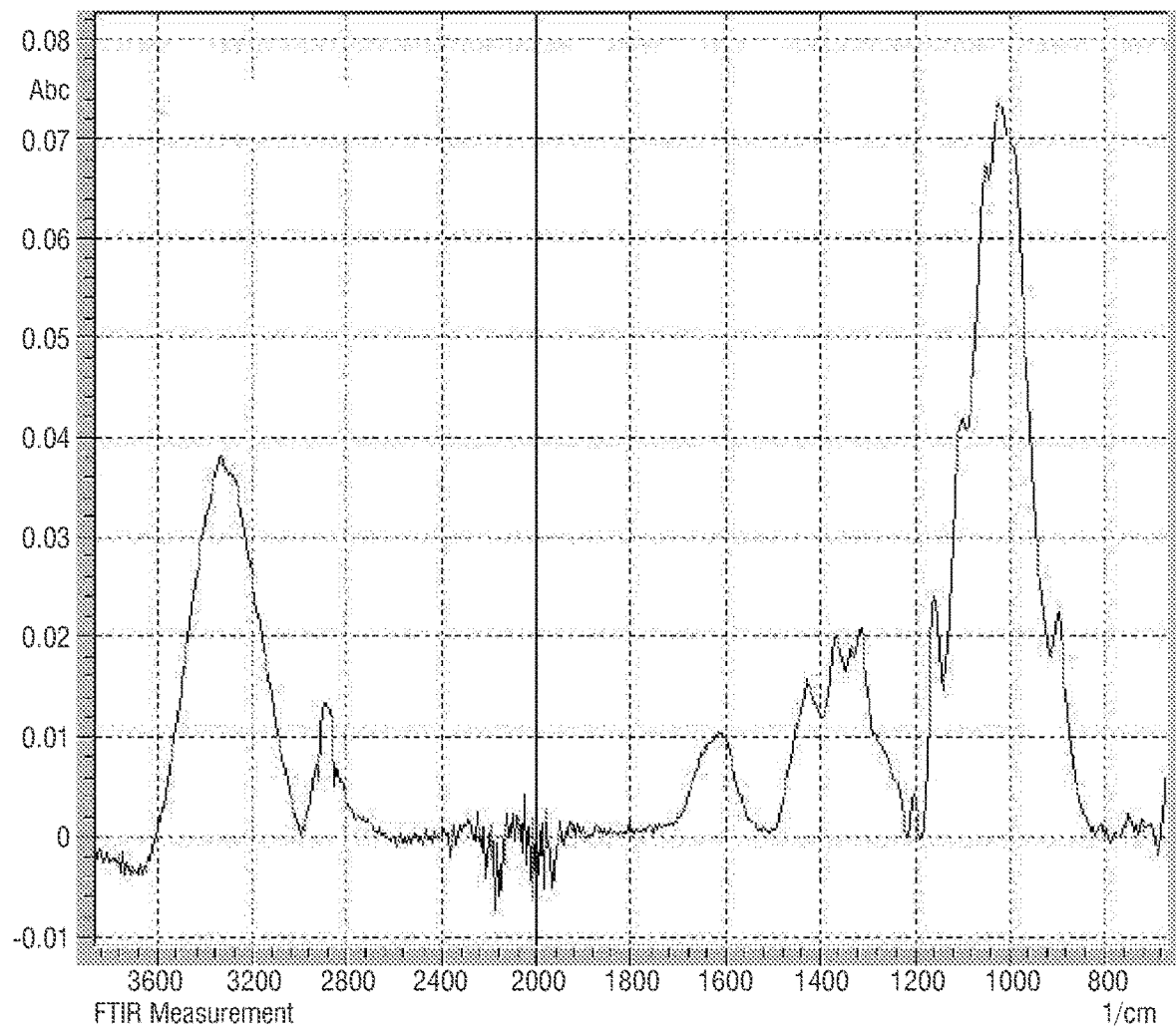
FIG. 11 shows the solid IR spectra of nanocellulose derived from glycine.
Figure 12:
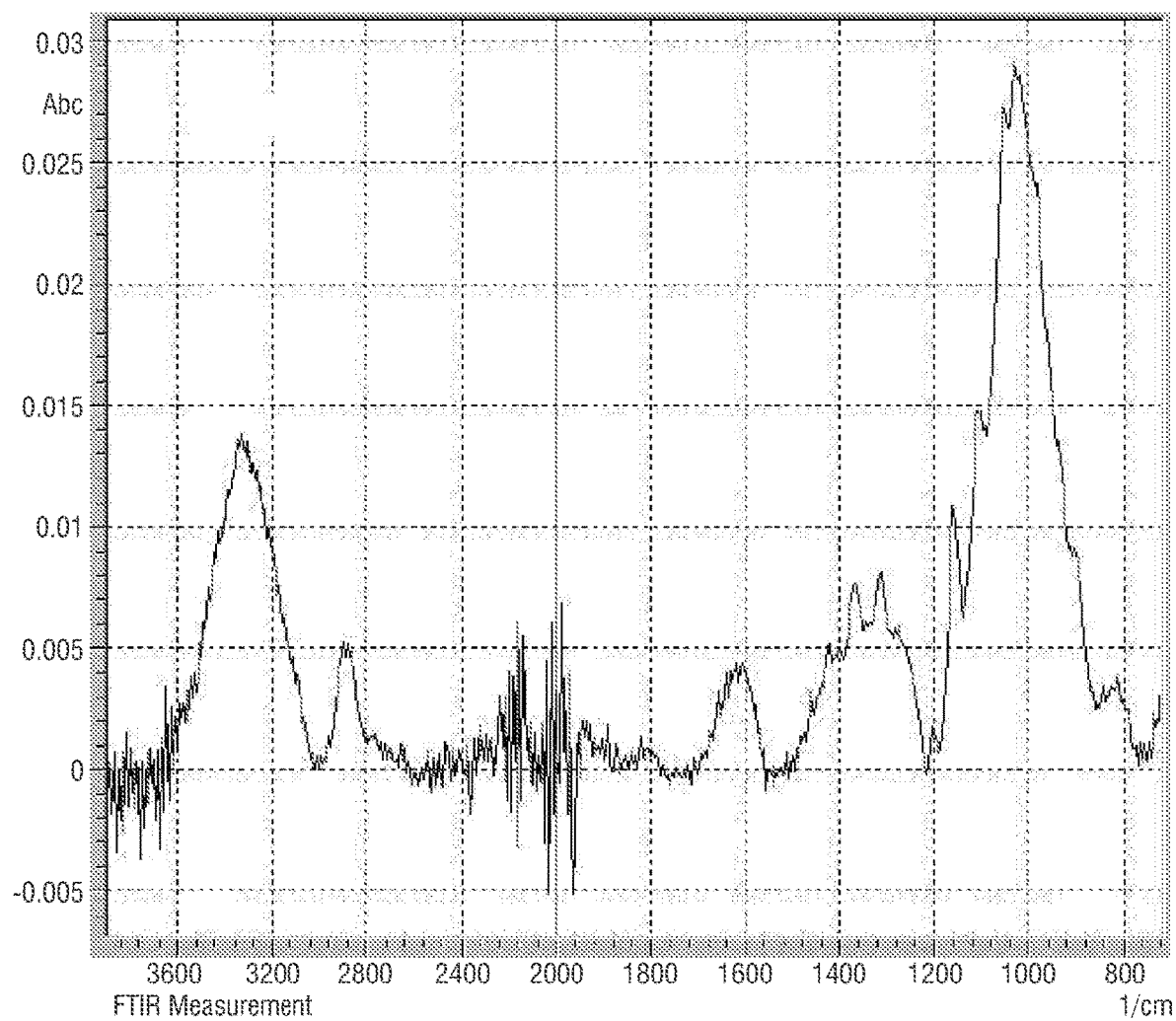
FIG. 12 shows the solid IR spectra of nanocellulose derived from lyine.
Figure 13:
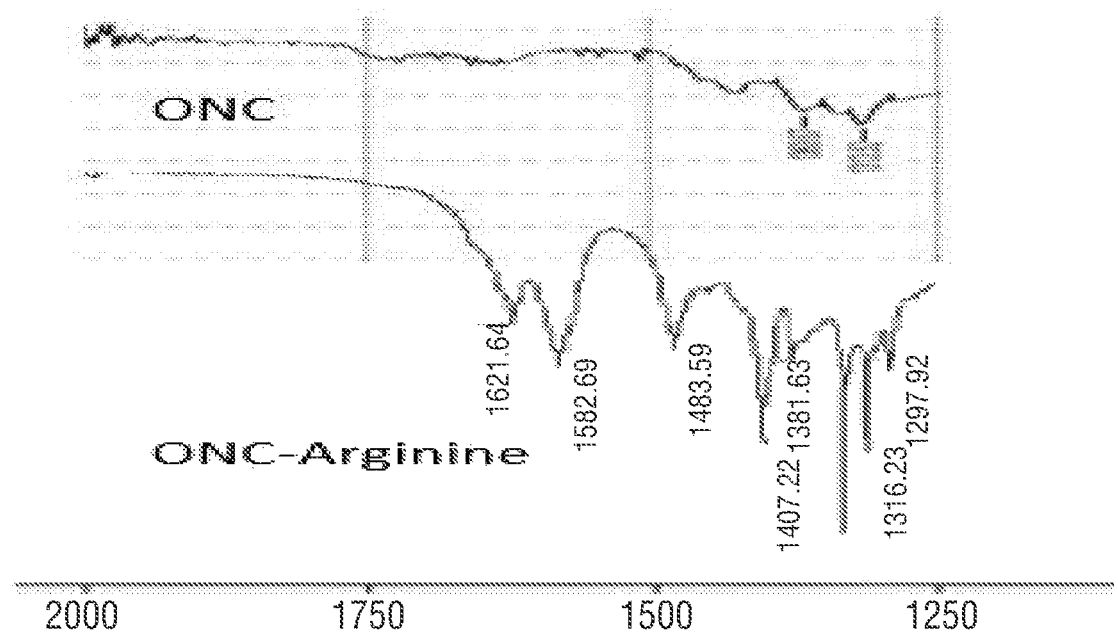
FIG. 13 shows the solid IR spectra of ONC and ONC-arginine in a region of 1200-2000 $cm^{-1}$ showing changes in CO stretching frequency after amide formation.
Figure 14:
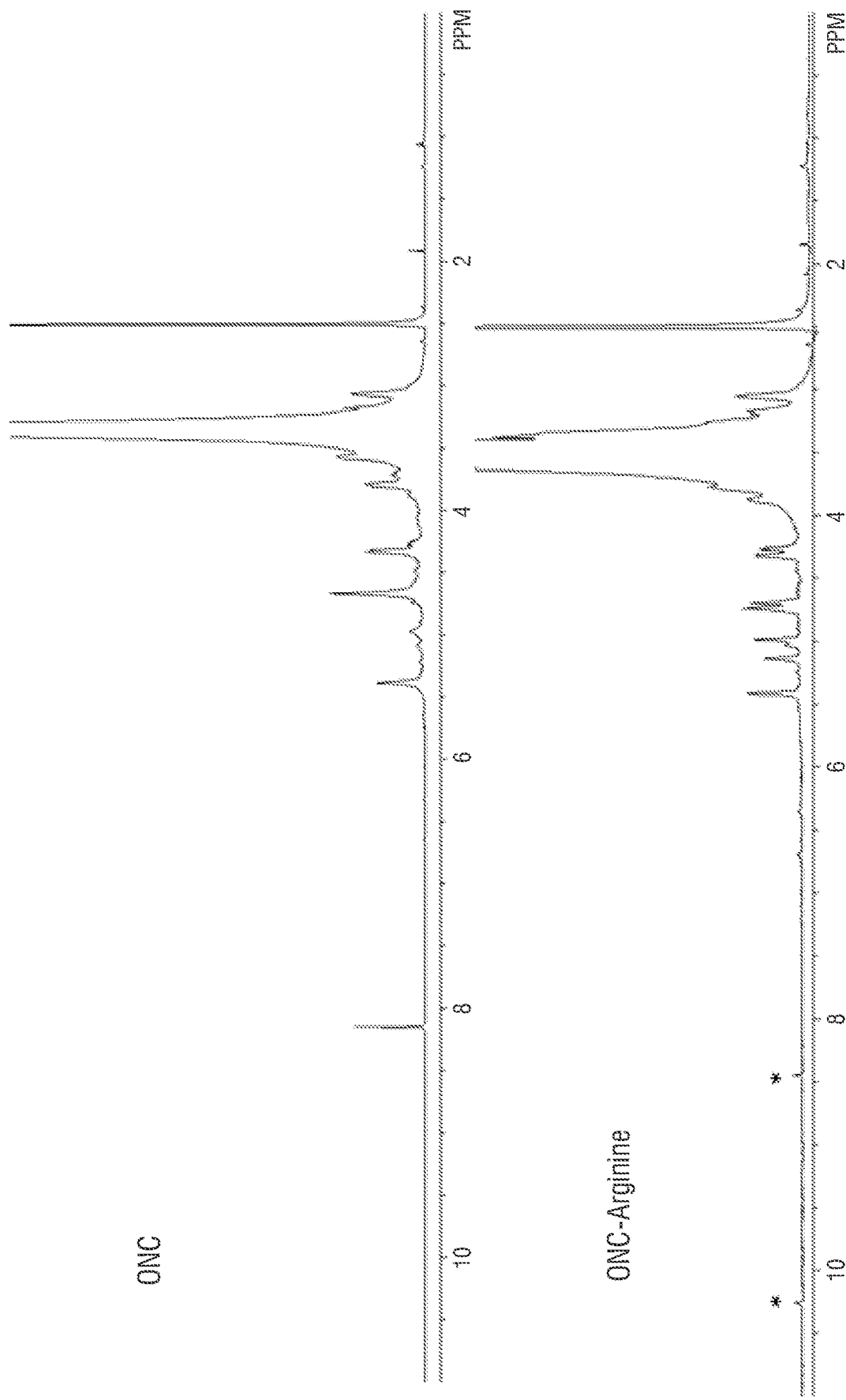
FIG. 14 shows $^1H$ NMR spectra of ONC solidum salt and ONC-arginine at RT in DMSO-$d_6$ showing new peaks (*) corresponding to the arginine group.

It was assumed that 100% of the glucose unit in nanocellulose is oxidized and formed ethyl carboxylic acid ester. Based on the weight percent solid content of ethyl carboxylic acid ester nanocellulose, the amount of amino acid was calculated. 8% ethyl carboxylic acid ester nanocellulose (30 g) was treated with arginine (2.67 g) and sodium bicarbonate or bicarbonate (1.59 g) in 65 mL DI water. The slurry was stirred at 40-45° C. overnight. Next day, it was centrifuged and washed with DI water several times to remove unreacted reactants to yield 17.74 g of 11.3% solid content white hydrogel. Similarly, the reaction of ethyl carboxylic acid ester nanocellulose with glycine or lysine produces the corresponding nanocellulose derivatives in quantitative yield. FIG. 11 and FIG. 12 show the IR spectra of nanocellulose glycine and lysine derivatives, showing the CO stretching frequency around 1600 $cm^{-1}$, respectively. FIG. 13 shows the solid IR spectra of ONC and ONC-arginine in a region of 1200-2000 $cm^{-1}$, showing changes in CO stretching frequency after amide formation. FIG. 14 shows $^1$H NMR spectra of ONC solidum salt and ONC-arginine at RT in DMSO-$d_6$, showing new peaks (*) corresponding to the arginine group.

Example 18

Preparation of sulfur and phosphorus-containing nanocellulose.

8% ethyl carboxylic acid ester nanocellulose (12.39 g) in di water (35 mL) was treated with 0-phosphoryl ethanolamine (2 g) and $NaHCO_3$ (1.19 g). The reaction mixture was stirred at 40-45° C. for 5 h. Then the resulting pale yellow slurry was centrifuged and washed with di water several times to remove extra reactants. Isolated yield: 19.29 g of 3.17% solid content white hydrogel. Similarly, reaction of ethyl carboxylic acid ester nanocellulose with cysteine HCl produces the corresponding nanocellulose (white hydrogel) in quantitative yield.

Example 19

Preparation of Nanocellulose-Based Nanomagnets

Figure 15:
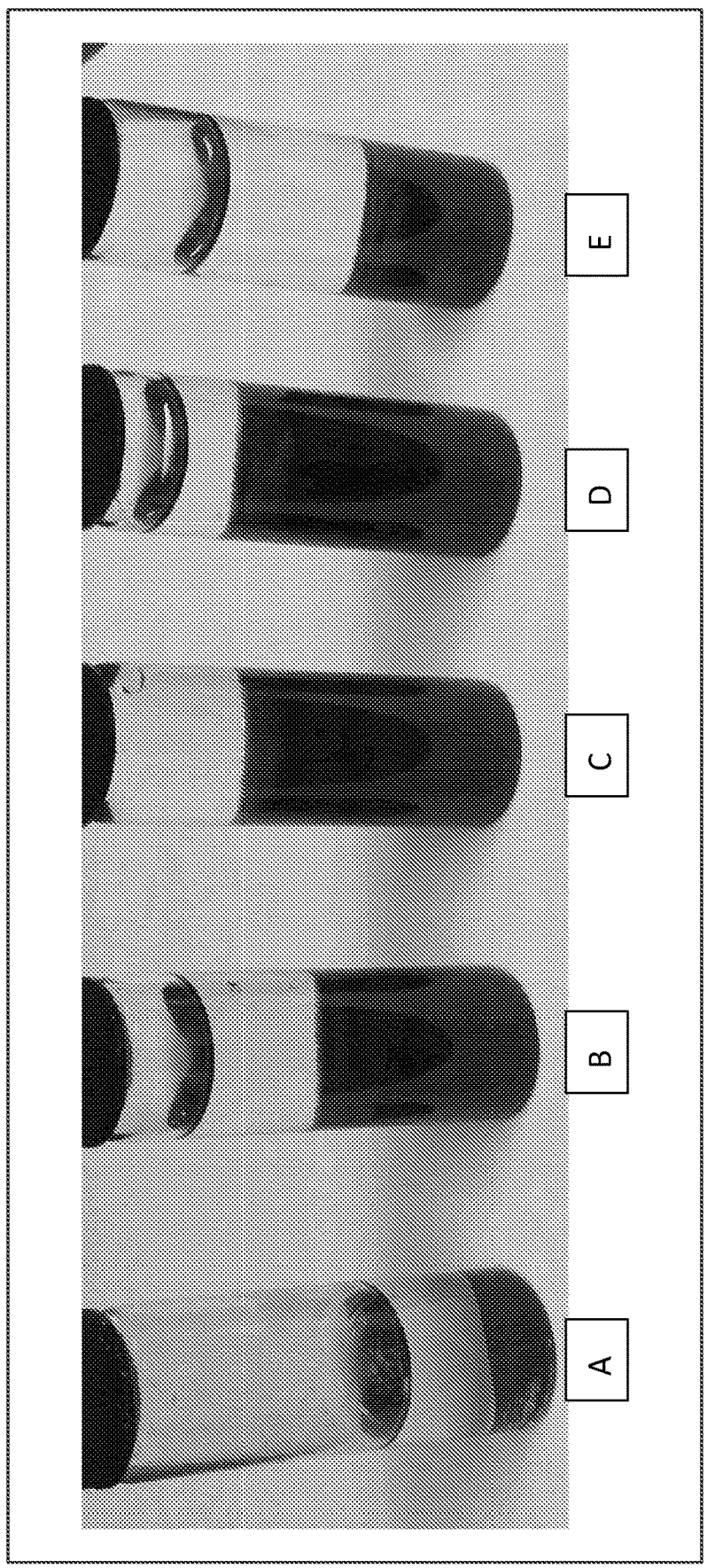
FIG. 15 shows optical images of (A) paramagnetic iron oxides, (B) carboxylic acid nanocellulose, (C) iron oxide mixed with the nanocellulose derived from glycine, (D) iron oxide mixed with the nanocellulose derived from ammonia, and (E) iron oxide mixed with the nanocellulose derived from arginine.

Superparamagnetic iron oxides and nanocellulose are generally prepared from a 1:8 (w/w) mixture of iron (II and III) oxides (25 mg) and 12.75% nanocellulose (1.57 g) in the presence of sodium carbonate. For example, a mixture of iron oxides (25 mg), 12.75% nanocellulose (1.57 g), and 3% sodium carbonate (3 mL) in 50 mL water were put vigorous mixing at around 1000 rpm at 45-50° C. for 1 h. As the reaction proceeded, the resulting black slurry was obtained. Then, it was settled down and decanted to remove extra nanocellulose. After addition of DI water and a small amount of sodium carbonate, the separation procedure was repeated until a clear top water solution was observed. The resulting black, superparamagnetic iron oxide and nanocellulose complex is stored in the presence of sodium carbonate. It is found that the complexation between iron oxide and nanocellulose derived from ammonia, glycine, and lysine was not stable enough with absence of sodium carbonate. However, in case of nanocellulose derived from O-phosphoryl ethanolamine and arginine, the iron oxide adducts are stable without sodium carbonate. FIG. 15 shows optical images of (A) paramagnetic iron oxides, (B) carboxylic acid nanocellulose, (C) iron oxide mixed with the nanocellulose derived from glycine, (D) iron oxide mixed with the nanocellulose derived from ammonia, and (E) iron oxide mixed with the nanocellulose derived from arginine. These images demonstrate enhanced colloidal stability after the treatments, indicating close interactions between the modified nanocellulose and iron oxides.

Example 20

Cellulose Cleavage of Hydroxylethyl Cellulose (HEC).

Figure 16:
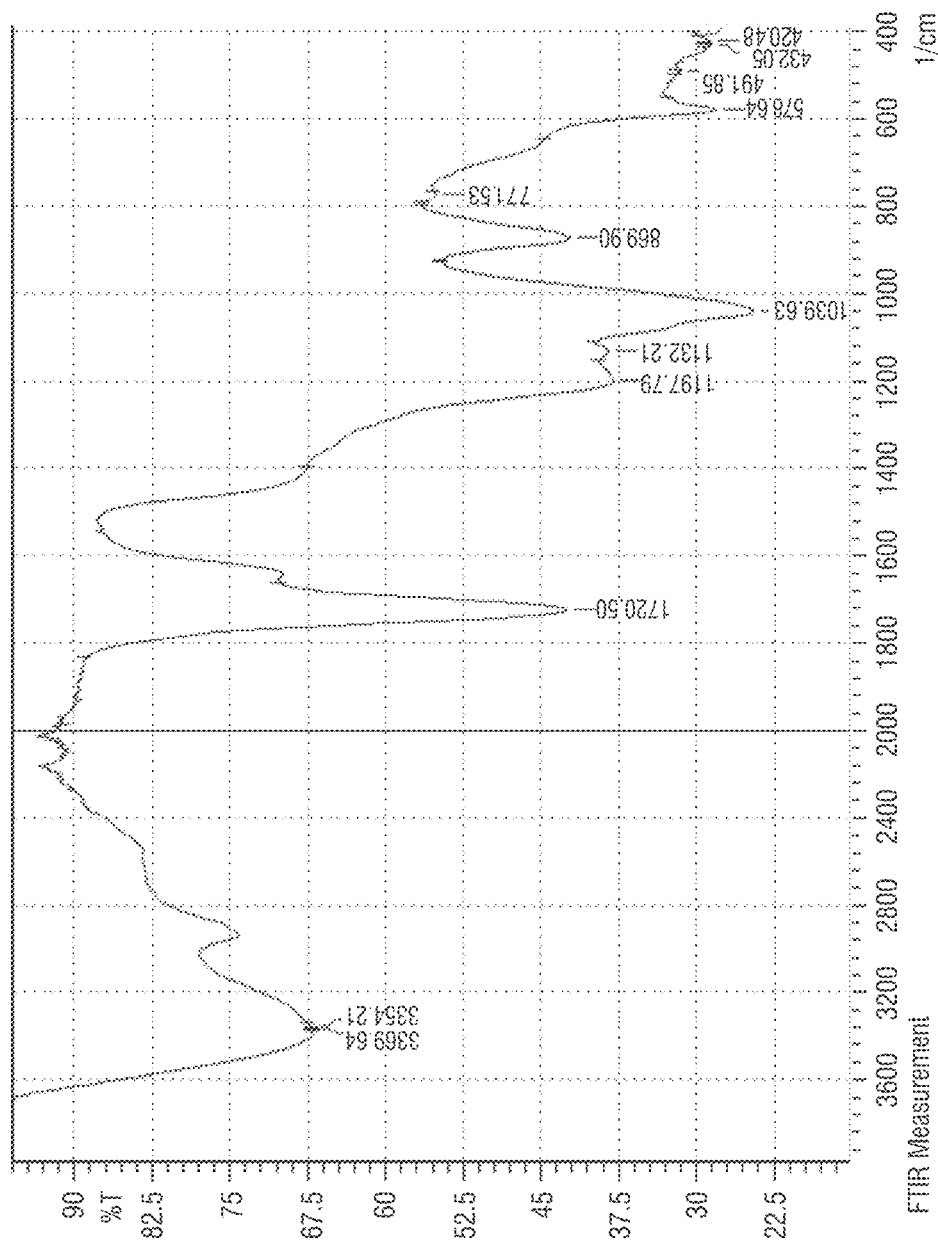
FIG. 16 shows the IR spectrum for the nanocellulose derivative derived from hydroxyethyl cellulose showing strong CO peaks around 1720-1750 $cm^{-1}$.

A mixture of SBS (4 g), 5% Fe(DPA)(CTA) (8 g), commercial HEC (24 g), 35% $H_2O_2$ (11.43 g), and 300 mL DI water was charged into 500 mL flask. Then it was heated at 45-50° C. in water bath. As $H_2O_2$ depletes, additional $H_2O_2$ was added. Around 5×11.43 g of 35% $H_2O_2$ was added to the reaction mixture over a period of 2 days. The resulting pale yellow solution was put under reduced pressure in water bath to reduce the volume to around 100 mL. The resulting sticky pale yellow gel was extracted into acetone (~300 mL) and filtered off through filter paper or centrifuged to remove the salt and catalyst. The colorless or pale yellow solution was put under vacuum to yield 23 g (40% solid content) of a pale yellow gel. FIG. 16 shows the IR spectrum nanocellulose derivative derived from hydroxylethyl cellulose, showing strong CO peaks around 1720-1750 cm$^{-1}$. It suggests the hydroxyl ethyl groups and unsubstituted hydroxylmethyl groups in HEC are oxidized during cellulose cleavage.

The invention being thus described, it will be obvious that the same may be varied in many ways. Such variations are not to be regarded as a departure from the spirit and scope of the invention and all such modifications are intended to be included within the scope of the following claims.

The above specification provides a description of the manufacture and use of the disclosed compositions and methods. Since many embodiments can be made without departing from the spirit and scope of the invention, the invention resides in the claims.

What is claimed is:

1. A method of producing oxidized cellulose comprising contacting an unmodified cellulose at a temperature with an oxidation composition for a period to produce an oxidized cellulose,
wherein the oxidation composition comprises an iron-organic acid complex and hydrogen peroxide;
and the iron-organic acid complex comprises an iron ion, 2,6-pyridine dicarboxylic acid (DPA), and at least one organic acid.

2. The method of claim 1, wherein the oxidized cellulose is a polymer comprising a monomer represented by formula II,

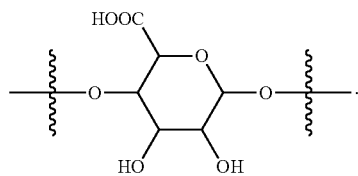

3. The method of claim 1, wherein the iron ion is $Fe^{2+}$, $Fe^{3+}$ ion, or a combination thereof.

4. The method of claim 1, wherein the at least one organic acid is malonic acid, oxalic acid, citric acid, tartaric acid, 2-pyridinecarboxylic acid, succinic acid, trimethylglycine, a pyridine carboxylic acid, a salicylic acid, or a combination thereof.

5. The method of claim 1, wherein the temperature is between from about 30° C. to about 100° C. and wherein the period is from about 30 minutes to about 5 days.

6. The method of claim 1, wherein the complex is present in the oxidation composition at a concentration of from about 0.001 wt % to about 10 wt %.

7. The method of claim 1, wherein the hydrogen peroxide is present in the oxidation composition at a concentration of from about 0.1 wt % to about 50 wt %.

8. The method of claim 1, wherein the oxidized cellulose is a microcellulose, nanocellulose, or a combination thereof.

9. The method of claim 1, wherein the oxidized cellulose is a product of particles, rod, whiskers, or combination thereof, whose diameter or length is less than 10 μm, less than 8 μm, less than 5 μm, less than 2 μm, less than 1 μm, less than 500 nm, less than 200 nm, less than 150 nm, less than 100 nm, less than 50 nm, or less than 30 nm.

10. The method of claim 1, wherein the oxidation composition further comprises an inorganic acid and wherein the inorganic acid is present at a concentration of from about 0.001 wt % to about 20 wt %.

11. The method of claim 10, wherein the inorganic acid is sulfuric acid, nitric acid, hydrogen chloric acid, phosphoric acid, hydrogen phosphate, perchloric acid, sulfonic acid, fluoroboric acid, fluoro sulfonic acid hexaflurorphosphoric acid, sulfonic acid, alkyl sulfonic acid, alkyl phosphonic acid, alkyl hydrogen phosphonic acid, dihydrogen phosphate, or a combination thereof, and is present in the oxidation composition at a concentration of from about 0.001 wt % to about 20 wt %.

12. A method of producing a modified nanocellulose comprising:
contacting an oxidized cellulose with a cleavage composition at a temperature for a period to form an oxidized nanocellulose,
wherein the cleavage composition comprises an iron-organic acid complex and hydrogen peroxide;
the iron-organic acid complex comprises an iron ion, 2,6-pyridine dicarboxylic acid (DPA), and at least one organic acid; and
the oxidized cellulose or oxidized nanocellulose is a polymer comprising a monomer represented by formula II

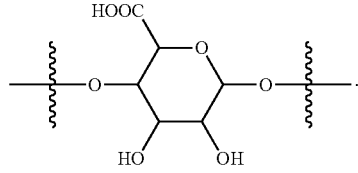

13. The method of claim 1, the method further comprising:
contacting the oxidized cellulose with a modification composition at a second temperature for a second period to form a modified cellulose,
wherein the modification composition comprises (a) a modification agent and (b) an acid, and
the modification agent is an alcohol, amine, peptide, amino acid, carboxylic acid anhydride, or a combination thereof.

14. The method of claim 13, wherein the modified cellulose is a polymer comprising a monomer represented by formula

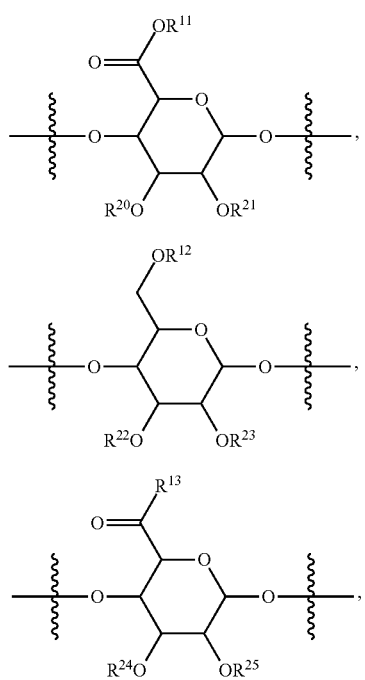

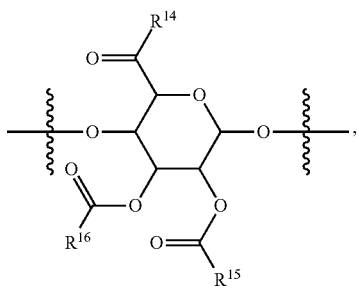

or a combination thereof, wherein $R^{11}$, $R^{12}$, or $R^{20}$-$R^{25}$ are independently H, substituted or un-substituted alkyl, substituted or un-substituted aryl, $(CH_2CH_2O)_nH$, $(CH(CH_3)CH_2O)_nH$, or $(CH_2)_nSi(CH_3)_3$, $R^{13}$-$R^{16}$ are independently H, an amine, or amino groups, and n is an integer of 1-100.

15. The method of claim 12, wherein the cleavage composition further comprises an inorganic acid or salt thereof, the inorganic salt is present in the cleavage composition at a concentration of from about 0.001 wt % to about 30 wt %.

16. The method of claim 13, wherein the modification agent is an alcohol, amine, organic acid anhydride, peptide, $NHR^3R^4$, or combination thereof, where $R^3$ and $R^4$ is independently H, $C_1$-$C_{20}$ substituted or unsubstituted alkyl or aryl groups, and wherein the modification agent is present in the modification composition at a concentration of from about 1 wt % to about 99 wt %.

17. The method of claim 13, wherein the acid is sulfuric acid, nitric acid, hydrogen chloric acid, phosphoric acid, hydrogen phosphate, fluoroboric acid, fluoro sulfonic acid, dihydrogen phosphate, or a mixture thereof, and wherein the acid is present in the modification composition at a concentration of from about 0.0001 wt % to about 10 wt %.

* * * * *